United States Patent
Grappin et al.

(10) Patent No.: US 12,475,180 B2
(45) Date of Patent: Nov. 18, 2025

(54) SERVER AND METHOD FOR GENERATING DIGITAL CONTENT FOR USERS OF A RECOMMENDATION SYSTEM

(71) Applicant: COMMUNAUTE WOOPEN INC., Montreal (CA)

(72) Inventors: Edwin Grappin, Seville (ES); Jerome Verdier, Montreal (CA)

(73) Assignee: COMMUNAUTE WOOPEN INC., Montreal (CA)

( * ) Notice: Subject to any disclaimer, the term of this patent is extended or adjusted under 35 U.S.C. 154(b) by 0 days.

(21) Appl. No.: 18/282,121

(22) PCT Filed: Mar. 31, 2022

(86) PCT No.: PCT/IB2022/053040
§ 371 (c)(1),
(2) Date: Sep. 14, 2023

(87) PCT Pub. No.: WO2022/208446
PCT Pub. Date: Oct. 6, 2022

(65) Prior Publication Data
US 2024/0169003 A1   May 23, 2024

(30) Foreign Application Priority Data

Apr. 1, 2021   (EP) .................................. 21305425

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC . G06F 16/9535; G06F 16/9538; G06F 16/907
See application file for complete search history.

(56) References Cited

U.S. PATENT DOCUMENTS

| | | | | |
|---|---|---|---|---|
| 11,354,378 | B2* | 6/2022 | Chawla | G06F 40/166 |
| 11,934,475 | B2* | 3/2024 | Mestres | G06F 16/685 |
| 2019/0340280 | A1* | 11/2019 | Silva | G06F 16/9535 |

(Continued)

OTHER PUBLICATIONS

International Search Report from PCT/IB2022/053040, Jun. 10, 2022, Krawaritis, Achilles.

*Primary Examiner* — Dangelino N Gortayo
(74) *Attorney, Agent, or Firm* — BCF LLP

(57) ABSTRACT

Methods and servers for displaying a digital item to users of a recommendation system are disclosed. The method comprises determining first and second recommendable contents that include the digital item for a first and a second user of a first and a second electronic devices respectively. The digital item is associated with a plurality of actions. The method comprises triggering display of at least some content from the first and second recommendable content including the digital item on the first and second electronic devices respectively. The digital item is associated with a first action triggerable by the first user on the first electronic device and a second action triggerable by the second user on the second electronic device. The first and second actions are selected among the plurality of actions based information about the first and second users respectively.

13 Claims, 11 Drawing Sheets

(56) References Cited

U.S. PATENT DOCUMENTS

| | | |
|---|---|---|
| 2020/0110754 A1* | 4/2020 | Lamburt ............ G06F 16/24578 |
| 2021/0034685 A1 | 2/2021 | Miller et al. |
| 2021/0263978 A1* | 8/2021 | Banipal .................. G06F 16/95 |
| 2022/0414538 A1* | 12/2022 | Badr ................... G06F 16/9535 |

* cited by examiner

SERVER AND METHOD FOR GENERATING DIGITAL CONTENT FOR USERS OF A RECOMMENDATION SYSTEM

CROSS-REFERENCE TO RELATED APPLICATIONS

The present patent application is a national phase entry of International Patent Application Number PCT/IB2022/053040 entitled "Server And Method For Generating Digital Content For Users Of A Recommendation System", filed on Mar. 31, 2022, which claims priority from European Patent Application Number 21305425.7, entitled "SERVER AND METHOD FOR GENERATING DIGITAL CONTENT FOR USERS OF A RECOMMENDATION SYSTEM", filed on Apr. 1, 2021, the content of each of which is incorporated herein by reference in its entirety.

FIELD

The present technology relates to computer-implemented recommendation systems. In particular, servers and methods for generating digital content for users of a recommendation system are disclosed.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a NETFLIX™ recommendation system, which system aggregates and recommends video content. The recommendation system stores video content about a variety of movies and tv-series, and presents some of it to a user, effectively "recommending" content to a given user even though the user may not have expressly expressed her/his desire in the particular content.

In some cases, potentially recommendable content of a recommendation system may be collected from one or more service providers (SP), or "third-party providers", usually advertise their respective services on various virtual platforms that may be accessed on the Internet. Users of said platforms are generally displayed with digital items (e.g. profiles, service offers, etc.) associated with the SPs on their personal devices (e.g. smartphones, personal computer, etc.). However, a quality of a service may greatly vary one SP to another. Therefore, such platforms enable users to rate and/or endorse different SPs that provided them with a service.

Different users have different needs when navigating the recommendation system. However, the size and complexity of recommendation platforms makes it difficult to ensure tailored navigation to satisfy a large variety of needs of respective users.

Even though the recent developments identified above may provide benefits, improvements are still desirable.

SUMMARY

Embodiments of the present technology have been developed based on developers' appreciation of shortcomings associated with the prior art.

At least one drawback of conventional recommendation systems is that when a user interacts with a recommended digital item, the user will typically be provided with additional content about the digital item. Moreover, although different users may have different behaviours and interests, interacting with a same recommended digital item will result in users being provided with the same additional content about that same digital item.

In at least some embodiments of the present technology, developers of the present technology have devised methods and servers that allow presenting a same digital content item to different users of the recommendation system, and upon interacting with the same digital content item, different users can be provided with different "specialized content" associated with that same digital content item. Without wishing to be bound to any specific theory, developers of the present technology have realized that presenting first specialized content to a first user that interacts with a given item based on information indicative of interests of the first user, and presenting second content to a second user that interacts with the same given item based on information indicative of interests of the second user, may increase user satisfaction and/or user engagement with content recommended by the recommendation system.

In at least some embodiments of the present technology, developers of the present technology have devised methods and servers that allow real-time control of user navigation paths in a recommendation system. A navigation path may include a sequence of digital items, webpages, and/or online events, and which have been viewed, visited and/or performed by a user when interacting with the recommendation system during a session. Developers have realized that directing different users from a common digital item to different specialized content based on information indicative of interests of the different users may allow directing users from the common digital item on separate navigation paths for increasing the likelihood of user satisfaction. It can also be said that directing different users on different navigation paths from a common digital item based on their respective interests may allow satisfying user needs quicker.

In other embodiments, directing different users on different navigation paths from a common digital item based on their respective interests may allow anonymous grouping of users of the recommendation system based on subsequences of digital items in the respective navigation paths. For example, similar users are likely to be directed on similar navigation paths—i.e., similarity of so-determined navigation paths can be used as a "proxy" for user similarity without requiring identification of specific users.

In further embodiments, directing different users on different navigation paths from a common digital item based on their respective interests may allow for better identification of network anomalies. Anomaly detection is the identification of rare events, items, or observations (such as rare navigation paths, for example) which are "suspicious" because they differ from standard behaviors or patterns. For example, directing users on respective navigation paths from a common digital item may allow better detection of fake users, online fraudsters, and spammers that can have a detrimental impact on the online community and the network infrastructure.

It should be noted that supervised, semi-supervised, or unsupervised machine learning techniques can be used for anomaly detection algorithms to be employed on data representative of user navigation paths. Supervised machine learning builds a predictive model using a labeled training set with normal and anomalous samples. The most common supervised methods include Bayesian networks, k-nearest neighbors, decision trees, supervised neural networks, and SVMs. The advantage of supervised models is that they may offer a higher rate of detection than unsupervised techniques. This is because they can return a confidence score with model output, incorporate both data and prior knowledge, and encode interdependencies between variables. Unsupervised methods do not demand manual labeling of training data. Instead, they operate based on the presumption that only a small, statistically different percentage of network traffic is malicious and abnormal. These techniques thus assume collections of frequent, similar instances are normal and flag infrequent data groups as malicious. The most popular unsupervised anomaly detection algorithms include Autoencoders, K-means, GMMs, hypothesis tests-based analysis, and PCAs. Semi-supervised anomaly detection may refer to an approach to creating a model for normal data based on a data set that contains both normal and anomalous data, but is unlabelled. This "train-as-you-go" method might be called semi-supervised. A semi-supervised anomaly detection algorithm might also work with a data set that is partially flagged. It will then build a classification algorithm on just that flagged subset of data, and use that model to predict the status of the remaining data.

In additional embodiments, developers have realized that directing different users on different navigation paths may be beneficial for maintaining good operation of the recommendation system during periods of increased demand. In one example, an online recommendation system may suffer from increased demand on its web servers (or specific web servers) when discounts, events, or new products or services become available and a high volume of users are directed to those discounts, events, or new products due to a static pre-determined navigation path in the recommendation system stemming from a given digital item. This high demand on at least some web servers may be reduced by controlling navigation paths for respective users. As a result, providing different navigation paths for respective users stemming from a common digital item may reduce the demand on some web servers of the recommendation system, as opposed to when all users are directed on a same pre-determined navigation path from the common digital item.

Other performance indicators of the recommendation system may also be managed by controlling navigation paths of respective users. Effect of navigation path management and control on performance indicators of a recommendation system may be measured using real traffic and/or synthetic workload generation for testing web servers of the recommendation system with artificial traffic.

In some embodiments of the present technology, there is provided methods and servers for selectively directing users of an online service along different navigation paths stemming from a same digital item while interacting with the service. As opposed to static, pre-determined, navigation paths that are available for users on some existing online platforms, methods and servers in some embodiments of the present technology allow users to be directed on different navigation paths by determining in real-time different triggerable actions to be provided to different users when interacting with a same digital item based on the respective user interests and/or system requirements.

It should be noted that users of a recommendation system as contemplated in some embodiments of the present technology may be interconnected with each other, forming groups of users, and where a pair of interconnected users tends to "trust" the other one's endorsements of service provider (SPs). Developers of the present technology have realized that a given user is more likely to trust endorsements of SPs in her immediate circle of interconnected users, or "friends", as opposed to other users of the recommendation system. However, having to access a profile of a user in one's immediate circle for consulting their endorsements of SPs is often time consuming and burdensome.

In at least some embodiments of the present technology, developers of the present technology have devised methods and servers that are configured to provide a given user with one or more digital items representative of recommended SPs that are selected from a ranked list of potentially recommendable SPs for a given user, and which list includes solely SPs that have been "endorsed" by her immediate circle. Moreover, these SPs may be ranked based on endorsement data collected from the immediate circle. It should be noted that the SPs may be ranked at least in part based on "structured" endorsement data (such as endorsement scores, for example) collected from the immediate circle and "unstructured" endorsement data (such as textual comments, images, and videos, for example) collected from the immediate circle.

In at least some embodiments of the present technology, the recommendation system may be a "commercially-oriented" recommendation system. Broadly speaking, a given commercially-oriented recommendation system may be of use to SPs that operate in a common commercial environment. Hence, users of such a system may be provided with digital content that is specific to a given commercial environment.

For instance, the recommendation system may be embodied as a given real-estate-oriented recommendation system where SPs operate in the real-estate sector. Such SPs may include, but are not limited to: designers, real estate agents, contractors, electricians, plumbers, insurance companies, decorators, landscaping agency, and so forth. Users of such a recommendation system may be provided with a digital content feed including real-estate-oriented digital content from the SPs non-exhaustively listed immediately above.

In another instance, the recommendation system may be embodied as a given car-oriented recommendation system where SPs operate in the car/automotive sector. Such SPs may include, but are note limited to: dealerships, insurance companies, after-market body shops, car repairing shops, manufacturers, valuators, mechanics, and so forth. Users of such a recommendation system may be provided with a digital content feed including car-oriented digital content from the SPs non-exhaustively listed immediately above.

In a further instance, the recommendation system may be embodied as a given healthcare-oriented recommendation system where SPs operate in a healthcare sector. Such SPs may comprise: doctors, clinics, chiropractors, personal trainers, gyms, nutritionists, supplement manufacturers, training equipment distributors, and so forth. Users of such a recommendation system may be provided with a digital content feed including healthcare-oriented digital content from the SPs non-exhaustively listed immediately above.

Methods and servers for recommending a service provider (SP) to a user of a recommendation platform are disclosed in some embodiments of the present technology. The method comprises determining a subset of users that are connected with the user; accessing endorsement data associated with the subset of users, the endorsement data comprising structure and unstructured endorsement data and being indicative of endorsed SPs by the subset of users; ranking the endorsed SPs into a ranked list of endorsed SPs based on information about the user and the endorsement data of SPs; and triggering display of a digital item representative of at least one top ranked endorsed SP from the ranked list on an electronic device of the user without an explicit request from the user for being presented with the at least one top ranked endorsed SP.

In a first broad aspect of the present technology, there is provided a method of controlling navigation paths of users of a recommendation system. The recommendation system is hosted by a server. The users are associated with respective electronic devices, the respective electronic devices being communicatively coupled with the server. The method is executable by the server. The method comprises determining, by the server, first recommendable content for a first user of a first electronic device and second recommendable content for a second user of a second electronic device, the first user being distinct from the second user. The first and the second recommendable content both include the digital item. The digital item is associated with a plurality of actions. The method comprises triggering, by the server, display on the first electronic device of at least some content from the first recommendable content including the digital item associated with a first action from the plurality of actions, the first action being triggerable by the first user on the first electronic device. The first action is selected from the plurality of actions based on information about the first user. The method comprises upon the first user triggering the first action, directing the first user on a first navigation path in the recommendation system including the digital item. The method comprises triggering, by the server on the second electronic device, display of at least some of the second recommendable content including the digital item associated with a second action from the plurality of actions, the second action being triggerable by the second user on the second electronic device. The second action is selected from the plurality of actions based on the second user. The first action triggerable by the first user is distinct from the second action triggerable by the second user. The method comprises, upon the second user triggering the second action, directing the second user on a second navigation path in the recommendation system including the digital item, and the first navigation path is different from the second navigation path In some embodiments of the method, the digital item is associated with a plurality of service providers (SP), or "third-party providers". The first action associated with the digital item is associated with a first one of the plurality of third-party providers, the first action being further selected based on information about the first one from the plurality of third-party providers. The second action associated with the digital item is associated with a second one of the plurality of third-party providers, the second action being further selected based on the second one from the plurality of third-party providers.

In some embodiments of the method, the first one and the second one from the plurality of third-party providers are a same third-party provider from the plurality third-party providers, the first action and the second action being associated with the same third-party provider from the plurality of third-party providers.

In some embodiments of the method, triggering the display of the at least some content from the first recommendable content including the digital item associated with the first action comprises: triggering, by the server on the first electronic device, display of the digital item with a first interface element, the first interface element for triggering the first action by the first user instead of the second action. The triggering the display of the at least some content from the second recommendable content including the digital item associated with the second action comprises triggering, by the server on the second electronic device, display of the digital item with a second interface element, the second interface element for triggering the second action by the second user instead of the first action.

In some embodiments of the method, the first interface element is a first button, and the second interface element is a second button, the first button being distinct from the second button.

In some embodiments of the method, the first action is provision of a first additional digital item generated by the first one from the plurality of third-party providers, the first additional digital item being subsequent to the digital item in the first navigation path, the second action is provision of a second digital item generated by the second one from the plurality of third-party providers, the second additional digital item being subsequent to the digital item in the second navigation path.

In some embodiments of the method, the first action is launching a communication channel between the first user and the first one from the plurality of third-party providers, the communication channel being subsequent to the digital item in the first navigation path.

In some embodiments of the method, the method further comprises anonymously grouping the first user into a first group of users based on the first navigation path and the second user into a second group of users based on the second navigation path. Users in the first group of users share at least a first subsequence of digital items from the first navigation path, and users in the second group of users share at least a second subsequence of digital items from the second navigation path.

In some embodiments of the method, the determining the first recommendable content and the second recommendable content comprises determining, by the server, a first set of digital items from a pool of potentially recommendable items for the first user based on a relevance of respective content to the first user. The first set of digital items is the first recommendable content and includes the digital item. The method comprises determining, by the server, a second set of digital items from the pool of potentially recommendable items for the second user based on a relevance of respective content to the second user. The second set of digital items is the second recommendable content and includes the digital item.

In some embodiments of the method, the method further comprises ranking, by the server employing a Machine Learning Algorithm (MLA), digital items from the first recommendable content into a ranked list of recommendable digital items. The method further comprises selecting, by the server, top ranked digital items from the ranked list as the at least some of the first recommendable content to be displayed to the first user, the top ranked digital items including the digital item associated with the first action.

In some embodiments of the method, the MLA is configured to rank the digital item associated with the first action in the ranked list for the first user based on the information about the first user and the first action.

In some embodiments of the method, the method further comprises generating, by the server, a training set for training the MLA. The training set includes a first training item dataset comprising information indicative of a training digital item associated with a first training action, a second training item dataset comprising information indicative of the training digital item associated with a second training action, a training user dataset indicative of information about a training user and a training label indicative of that previously displaying the training item from the first training item dataset to the training user resulted in more user engagement than previously displaying the training item from the second training item dataset. The method further comprises training, by the server, the MLA based on the training set to predict a first ranking score for the training item from the first training item dataset and a second ranking score for the training item from the second training item dataset, and such that the first ranking score is above the second ranking score.

In some embodiments of the method, the first training action is associated with a first training third-party provider, and the second training action is associated with a second training third-party provider.

In some embodiments of the method, the method further comprises determining, by the server, a recommended third-party provider for the first user amongst the plurality of third-party providers associated with the digital item based on endorsement of respective ones from the plurality of third-party providers by other users of the recommendation system. The other users are connected to the first user on the recommendation system. The recommended third-party is the first one from the plurality of third-party providers associated with the first action.

In a second broad aspect of the present technology, there is provided a server for controlling navigation paths of users of a recommendation system, the server hosting the recommendation system. The server is communicatively coupled with a first electronic device associated with a first user and a second electronic device associated with a second user. The first and the second electronic devices are configured to display interfaces of the recommendation system to the first and second users respectively. The server is communicatively coupled with a memory storing potentially recommendable digital items. The server is configured to determine first recommendable content for a first user of a first electronic device and second recommendable content for a second user of a second electronic device, the first user being distinct from the second user. The first and the second recommendable content both include the digital item. The digital item is associated with a plurality of actions. The server is configured to trigger on the first electronic device, display of at least some content from the first recommendable content including the digital item associated with a first action from the plurality of actions, the first action being triggerable by the first user on the first electronic device. The first action is selected from the plurality of actions based on information about the first user. The server is configured to, upon the first user triggering the first action, direct the first user on a first navigation path in the recommendation system including the digital item. The server is configured to trigger on the second electronic device, display of at least some of the second recommendable content including the digital item associated with a second action from the plurality of actions, the second action being triggerable by the second user on the second electronic device. The second action is selected from the plurality of actions based on information about the second user. The first action triggerable by the first user is distinct from the second action triggerable by the second user. The server is configured to upon the second user triggering the second action, direct the second user on a second navigation path in the recommendation system including the digital item. The first navigation path is different from the second navigation path.

In some embodiments of the server, the digital item is associated with a plurality of third-party providers. The first action associated with the digital item is further associated with a first one of the plurality of third-party providers. The first action is further selected based on information about the first one from the plurality of third-party providers. The second action associated with the digital item is further associated with a second one of the plurality of third-party providers. The second action is further selected based on information about the second one from the plurality of third-party providers.

In some embodiments of the server, the first one and the second one from the plurality of third-party providers are a same third-party provider from the plurality third-party providers, the first action and the second action being associated with the same third-party provider from the plurality of third-party providers.

In some embodiments of the server, upon triggering the display of the at least some content from the first recommendable content including the digital item associated with the first action, the server is further configured to trigger on the first electronic device, display of the digital item with a first interface element, the first interface element for triggering the first action by the first user instead of the second action. Upon triggering the display of the at least some content from the second recommendable content including the digital item associated with the second action, the server is further configured to trigger on the second electronic device, display of the digital item with a second interface element, the second interface element for triggering the second action by the second user instead of the first action.

In some embodiments of the server, the first interface element is a first button, and the second interface element is a second button, the first button being distinct from the second button.

In some embodiments of the server, the first action causes the server to trigger provision of a first additional digital item generated by the first one from the plurality of third-party providers to the first electronic device. The first additional digital item is subsequent to the digital item in the first navigation path. The second action causes the server to trigger provision of a second digital item generated by the second one from the plurality of third-party providers. The second additional digital item is subsequent to the digital item in the second navigation path.

In some embodiments of the server, the first action causes the server to launch a communication channel between the first user and the first one from the plurality of third-party providers, the communication channel being subsequent to the digital item in the first navigation path.

In some embodiments of the server, the server is configured to anonymously group the first user into a first group of users based on the first navigation path and the second user into a second group of users based on the second navigation path. Users in the first group of users share at least a first subsequence of digital items from the first navigation path. Users in the second group of users share at least a second subsequence of digital items from the second navigation path.

In some embodiments of the server, upon determining the first recommendable content and the second recommendable content, the server is further configured to determine a first set of digital items from a pool of potentially recommendable items for the first user based on a relevance of respective content to the first user. The first set of digital items is the first recommendable content and includes the digital item. The server is further configured to determine a second set of digital items from the pool of potentially recommendable items for the second user based on a relevance of respective content to the second user. The second set of digital items being the second recommendable content and including the digital item.

In some embodiments of the server, the server is configured to rank, by employing a Machine Learning Algorithm (MLA), digital items from the first recommendable content into a ranked list of recommendable items. The server is further configured to select top ranked digital items from the ranked list as the at least some of the first recommendable content to be displayed to the first user. The top ranked digital items include the digital item associated with the first action.

In some embodiments of the server, the MLA is configured to rank the digital item associated with the first action in the ranked list for the first user based on information about the first user and the first action.

In some embodiments of the server, the server is further configured to generate a training set for training the MLA. The training set includes a first training item dataset comprising information indicative of a training digital item associated with a first training action, a second training item dataset comprising information indicative of the training digital item associated with a second training action, a training user dataset indicative of information about a training user and a training label indicative of that previously displaying the training item from the first training item dataset to the training user resulted in more user engagement than previously displaying the training item from the second training item dataset. The server is further configured to train the MLA based on the training set to predict a first ranking score for the training item from the first training item dataset and a second ranking score for the training item from the second training item dataset, and such that the first ranking score is above the second ranking score.

In some embodiments of the server, the first training action is associated with a first training third party provider, and the second training action is associated with a second training third party provider.

In some embodiments of the server, the server is further configured to determine a recommended third-party provider for the first user amongst the plurality of third-party providers associated with the digital item based on endorsement of respective ones from the plurality of third-party providers by other users of the recommendation system. The recommended third-party provider is the first one from the plurality of third-party providers associated with the first action.

In a third broad aspect of the present technology, there is provided a method of recommending a third-party provider to a user of a recommendation system. The recommendation system is hosted by a server. The user is associated with an electronic device communicatively coupled with the server. The method is executable by the server. The method comprises determining, by the server, a subset of users from the recommendation system that are associated with the user. The subset of users exclusively includes users from the recommendation platform that are connected with the user on the recommendation system. The method further comprises accessing, by the server from a memory, endorsement data associated with the subset of users from the recommendation platform. The endorsement data is indicative of endorsed third-party providers by the subset of users. The endorsement data includes structured endorsement data indicative of endorsement scores provided by the subset of users for the endorsed third-party providers and unstructured endorsement data indicative of at least one of textual and visual information provided by the subset of users for the endorsed third-party providers. The method further comprises ranking, by the server, the endorsed third-party providers into a ranked list of endorsed third-party providers based on user data indicative of information about the user, the structure endorsement data and the unstructured endorsement data for respective ones from the endorsed third-party providers. The method further comprises triggering, by the server, display of a digital item representative of at least one top ranked endorsed third-party provider from the ranked list without an explicit request from the user for being presented with the at least one top ranked endorsed third-party provider.

In some embodiments of the method, the ranking the endorsed third-party providers into a ranked list of endorsed third-party providers comprises employing, by the server, a Machine Learning Algorithm (MLA).

In some embodiments of the method, the structured endorsement data comprises endorsement scores of more than one type such that a first type of endorsement scores is indicative of a quality of a first characteristic of a respective endorsed third-party provider, and a second type of endorsement scores is indicative of a quality of a second characteristic of the respective endorsed third-party provider.

In some embodiments of the method, the textual information provided by a given one from the subset of users for a respective endorsed third-party provider is a textual comment.

In some embodiments of the method, the visual information provided by a given one from the subset of users for a respective endorsed third-party provider is at least one of an image and a video.

In some embodiments of the method, the method further comprises accessing, by the server from the memory, training endorsement data associated with the subset of training users from the recommendation system. The training endorsement data is indicative of training endorsed third-party providers by the training subset of users. The method further comprises generating, by the server, a training set for training the MLA. The training set includes a training user vector representative of user data associated with a training user, a set of training third-party vectors for respective ones from the training endorsed third-party providers and representative of the respective structure endorsement data and unstructured endorsement data provided by the respective ones from the subset of training users, and a training label indicative of that previously recommending a given one from the training endorsed third-party providers to the training user resulted in more user engagement than previously recommending other ones from the training endorsed third-party providers to the training user.

In a fourth broad aspect of the present technology, there is provided a method of generating an indication of a third-party provider to a user of a computer-implemented system in response to a query from the user. The computer-implemented system is hosted by a server. The user is associated with an electronic device communicatively coupled with the server. The method is executable by the server. The method comprises acquiring, by the server from the electronic device, query data representative the query and indicative of an explicit request from the user for generating an indication of the third-party provider. The method comprises determining, by the server, a subset of users from the computer-implemented system that are associated with the user, the subset of users exclusively including users from the computer-implemented system that are connected with the user on the computer-implemented system. The method further comprises accessing, by the server from a memory, endorsement data associated with the subset of users from the computer-implemented system. The endorsement data is indicative of endorsed third-party providers by the subset of users. The endorsement data includes structured endorsement data indicative of endorsement scores provided by the subset of users for the endorsed third-party providers and unstructured endorsement data indicative of at least one of textual and visual information provided by the subset of users for the endorsed third-party providers. The method further comprises ranking, by the server, the endorsed third-party providers into a ranked list of endorsed third-party providers based on user data indicative of information about the user, query data, the structure endorsement data and the unstructured endorsement data for respective ones from the endorsed third-party providers. The method further comprises triggering, by the server, display of an indication representative of at least one top ranked endorsed third-party provider from the ranked list in response to the explicit request from the user.

In some embodiments of the method, wherein the ranking the endorsed third-party providers into the ranked list of endorsed third-party providers comprises employing, by the server, a Machine Learning Algorithm (MLA).

In some embodiments of the method, the structured endorsement data comprises endorsement scores of more than one type such that a first type of endorsement scores is indicative of a quality of a first characteristic of a respective endorsed third-party provider, and a second type of endorsement scores is indicative of a quality of a second characteristic of the respective endorsed third-party provider.

In some embodiments of the method, the textual information provided by a given one from the subset of users for a respective endorsed third-party provider is a textual comment.

In some embodiments of the method, the visual information provided by a given one from the subset of users for a respective endorsed third-party provider is at least one of an image and a video.

In a fifth broad aspect of the present technology, there is provided a server for recommending a third-party provider to a user of a recommendation system. The server configured to host the recommendation system and one electronic device communicatively coupled with the server. The electronic device is configured to display an interface of the recommendation system to a respective user. The system further comprises a memory communicably connected to the server, the memory comprising digital items to be displayed on the interface. The server is configured to determine a subset of users from the recommendation platform that are associated with the user. The subset of users exclusively includes users from the recommendation system that are connected with the user on the recommendation platform. The server is further configured to access, from the memory, endorsement data associated with the subset of users from the recommendation system, the endorsement data being indicative of endorsed third-party providers by the subset of users. The endorsement data includes structured endorsement data indicative of endorsement scores provided by the subset of users for the endorsed third-party providers and unstructured endorsement data indicative of at least one of textual and visual information provided by the subset of users for the endorsed third-party providers. The server is further configured to rank the endorsed third-party providers into a ranked list of endorsed third-party providers based on user data indicative of information about the user, the structure endorsement data and the unstructured endorsement data for respective ones from the endorsed third-party providers. The server is further configured to trigger display of a digital item representative of at least one top ranked endorsed third-party provider from the ranked list without an explicit request from the user for being presented with the at least one top ranked endorsed third-party provider.

In some embodiments of the server, the server employs a Machine Learning Algorithm (MLA) to rank the endorsed third-party providers into the ranked list of endorsed third-party providers.

In some embodiments of the server, the structured endorsement data comprises endorsement scores of more than one type such that a first type of endorsement scores is indicative of a quality of a first characteristic of a respective endorsed third-party provider, and a second type of endorsement scores is indicative of a quality of a second characteristic of the respective endorsed third-party provider.

In some embodiments of the server, the textual information provided by a given one from the subset of users for a respective endorsed third-party provider is a textual comment.

In some embodiments of the server, the visual information provided by a given one from the subset of users for a respective endorsed third-party provider is at least one of an image and a video.

In some embodiments of the server, the server is further configured to access from the memory, training endorsement data associated with the subset of training users from the recommendation system. The training endorsement data is indicative of training endorsed third-party providers by the training subset of users. The server is further configured to generate a training set for training the MLA. The training set includes a training user vector representative of user data associated with a training user, a set of training third-party vectors for respective ones from the training endorsed third-party providers and representative of the respective structured endorsement data and unstructured endorsement data provided by the respective ones from the subset of training users, and a training label indicative of that previously recommending a given one from the training endorsed third-party providers to the training user resulted in more user engagement than previously recommending other ones from the training endorsed third-party providers to the training user.

In a fifth broad aspect of the present technology, there is provided a server for generating an indication of a third-party provider to a user of a computer-implemented system in response to a query from the user. The system comprises a server configured to host the computer-implemented system and one electronic device communicatively coupled with the server. The electronic device is configured to display an interface of the computer-implemented system to a respective user. The system further comprises a memory communicably connected to the server. The server is configured to acquire, from the electronic device, query data representative the query and indicative of an explicit request from the user for generating an indication of the third-party provider. The server is further configured to determine a subset of users from the computer-implemented system that are associated with the user. The subset of users exclusively includes users from the computer-implemented system that are connected with the user on the computer-implemented system. The server is further configured to access, from the memory, endorsement data associated with the subset of users from the computer-implemented system. The endorsement data is indicative of endorsed third-party providers by the subset of users. The endorsement data includes structured endorsement data indicative of endorsement scores provided by the subset of users for the endorsed third-party providers and unstructured endorsement data indicative of at least one of textual and visual information provided by the subset of users for the endorsed third-party providers. The server is further configured to rank the endorsed third-party providers into a ranked list of endorsed third-party providers based on user data indicative of information about the user, query data, the structure endorsement data and the unstructured endorsement data for respective ones from the endorsed third-party providers. The server is further configured to trigger display of an indication representative of at least one top ranked endorsed third-party provider from the ranked list in response to the explicit request from the user.

In some embodiments of the server, the server employs a Machine Learning Algorithm (MLA) to rank the endorsed third-party providers into the ranked list of endorsed third-party providers.

In some embodiments of the server, the structured endorsement data comprises endorsement scores of more than one type such that a first type of endorsement scores is indicative of a quality of a first characteristic of a respective endorsed third-party provider, and a second type of endorsement scores is indicative of a quality of a second characteristic of the respective endorsed third-party provider.

In some embodiments of the server, the textual information provided by a given one from the subset of users for a respective endorsed third-party provider is a textual comment.

In some embodiments of the server, the visual information provided by a given one from the subset of users for a respective endorsed third-party provider is at least one of an image and a video.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
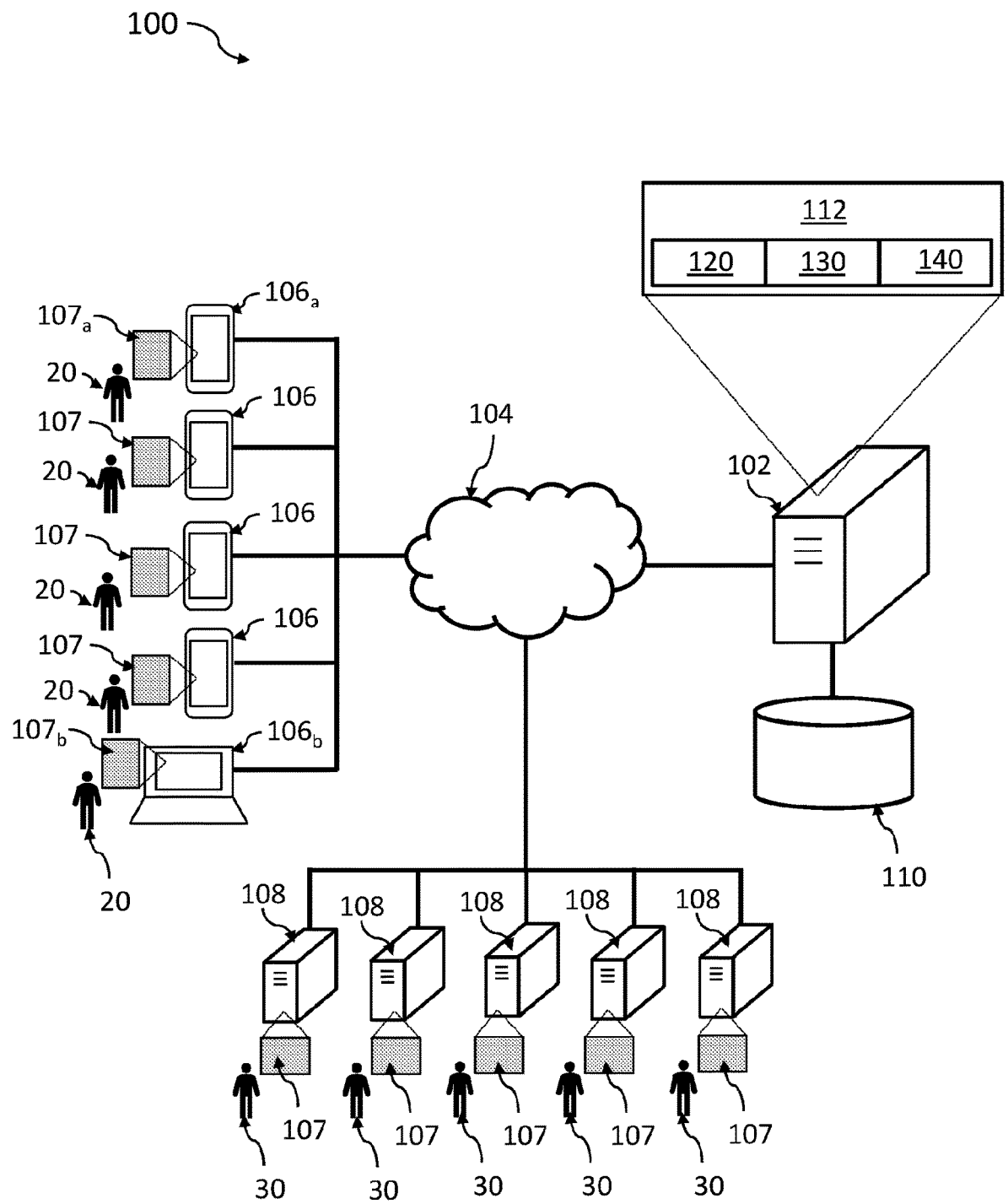
FIG. 1 is a schematic representation of recommendation environment in accordance with non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In some embodiments of the present technology, methods for displaying a digital item to users of a recommendation platform and for recommending a SP to a user of the recommendation platform are devices. At least some embodiments of the present technology provide techniques for maintaining a personalized network for a user, the personalized network being a subset of users from a recommendation platform. The user may manage the personalized network generated for that user. For example, the user may specify users to add to their personalized network in order to view digital content associated to those users. The personalized network may be symmetrical or asymmetrical. In a symmetrical personalized network, relationships between users are bidirectional, e.g. when user A adds user B to the personalized network of user A, user A is also added to the personalized network of user B. Thus, in a symmetrical personalized network, two connected users are hereafter referred to as "contacts", i.e. user A is a contact of user B and user B is a contact of user A.

In contrast, in an asymmetrical personalized network, relationships between users are unidirectional, e.g. when user A adds user B to their personalized network, user A is not necessarily added to the personalized network of user B (i.e., merely by virtue of user A adding user B). Thus, in an asymmetrical personalized network, there can be two users for which only one of the users may view digital content related to the other. The asymmetrical personalized network may include users "following" the user, i.e. a list of other users who have previously specified a desire to view digital content related to the user. The personalized network may also include a second list of users "followed" by the user, i.e. a list of other users from whom the user has previously specified a desire to view digital content related thereto.

While some embodiments are described with reference to an asymmetrical network, those skilled in the art will recognize that the techniques disclosed herein may be adapted to support other types of networks, such as symmetrical personalized networks.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide digital content recommendations and, more particularly, recommendations of digital items and/or of SPs to users of the system 100. For example, a user 20 (a given one of a plurality of users of the system 100) may be a subscriber to a recommendation service provided by the system 100. However, the subscription does not need to be explicit or paid for. For example, the user 20 can become a subscriber by virtue of downloading a recommendation application from the system 100, by registering and provisioning a log-in/password combination, by registering and provisioning user preferences and the like. As such, any system variation configured to generate digital items recommendations or, more generally, "content recommendations" for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the system 100, as will be described in greater detail herein below.

The system 100 may be, for example, used as a system for recommending real-estate-oriented content. In this example, the users may be individuals searching for real-estate related products, services and/or counsel. The users may thus use the recommendation system 100 to be recommended specific SPs such as plumbers, designers, carpenter, gardener, etc., and/or products such as swimming-pools, houses, furniture, etc.

In other non-limiting embodiments, the system 100 may be, for example, used a system for recommending content about the car industry. In this example, the users may be individuals searching for car related products, services and/ or counsel. The users may thus use the recommendation system 100 to be recommended specific SPs such as vehicle manufacturers, specialist coach builders, garage owners, original equipment manufacturers (OEM), automotive parts retailers, car insurance providers, etc., and/or products such as automotive parts, tires, etc.

More generally, the system 100 may be used as a recommendation system for providing a recommendation platform specialized in a specific commercial sector, thereby enabling users to communicate with professionals and/or experts of a corresponding field, and being provided with recommendations for digital content related to said field. Therefore, in at least some embodiments of the present technology, it is contemplated that the recommendation system 100 may provide specialized recommended content related to a specific commercial sector such as, without limitation, hotel business, healthcare, human resources and employment, boats and sailing, and so forth.

Electronic Device

The system 100 comprises a plurality of electronic devices 106, each electronic device being associated with a respective user 20. As such, the electronic device 106 can sometimes be referred to as a "client device", "user device" or "client electronic device". It should be noted that the fact that the electronic device 106 is associated with the user 20 does not need to suggest or imply any mode of operation— such as a need to log in, a need to be registered, or the like.

It should be noted that, although only one user 20 associated with a corresponding electronic device 106 is depicted in FIG. 1, it is contemplated that a user 20 associated with a electronic device 106 is a given user from the plurality of users of the system 100, and where each one of the plurality of users 20 can be associated with a respective electronic device 106.

The implementation of the user devices 106 is not particularly limited, but as an example, the user devices 106 may be implemented as a personal computer (desktops, laptops, netbooks, etc.), a wireless communication device (such as a smartphone, a cell phone, a tablet and the like), as well as network equipment (such as routers, switches, and gateways). The user devices 106 comprises hardware and/or software and/or firmware (or a combination thereof), as is known in the art, to execute a recommendation application 107. Generally speaking, the purpose of the recommendation application 107 is to enable the user 20 to receive (or otherwise access) digital content recommendations provided by the system 100 and, more specifically to display an interface of a recommendation platform 112 hosted on a recommendation server 102, as will be described in greater detail herein below.

Figure 2:
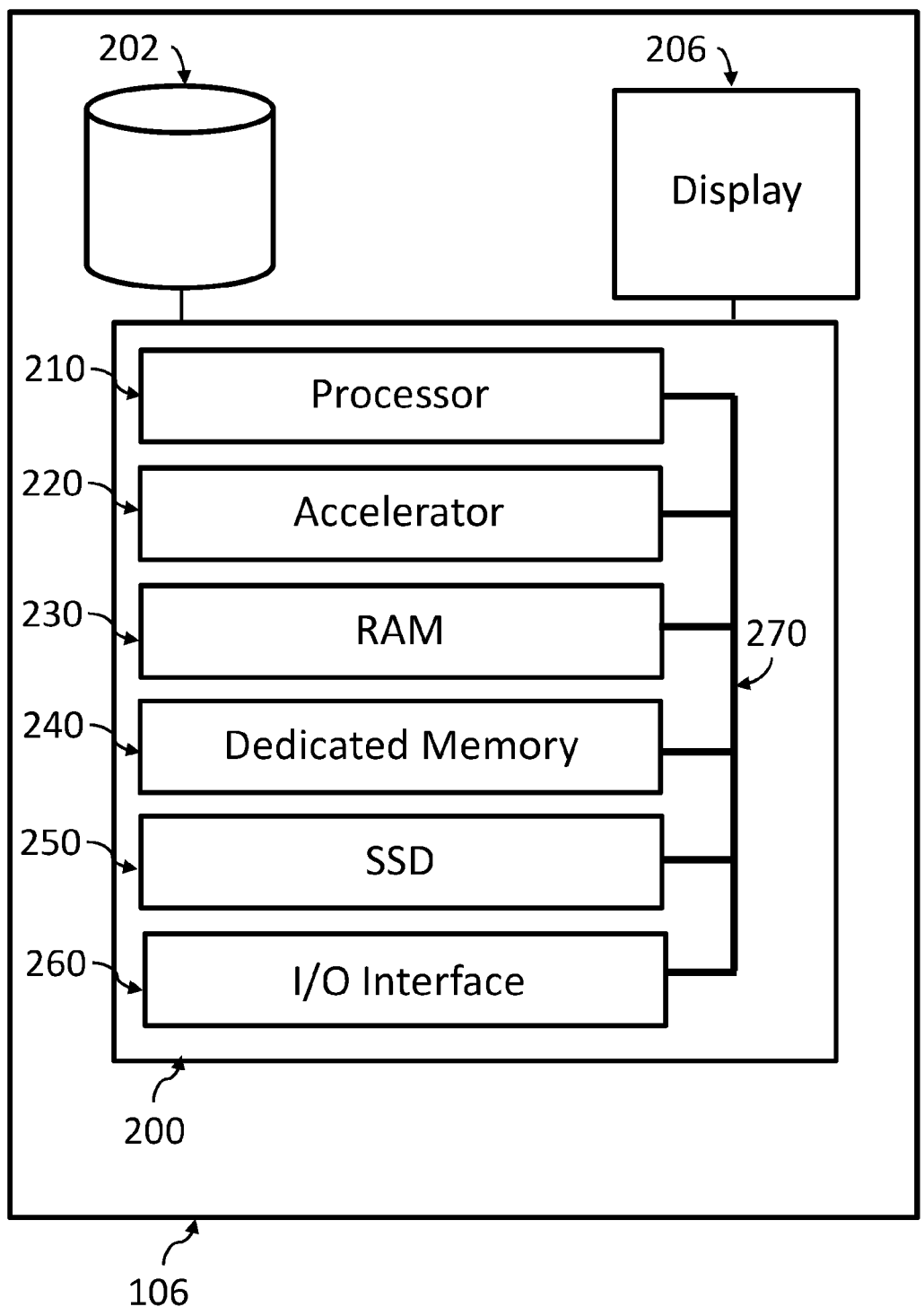
FIG. 2 is a schematic representation of a user device configured for accessing a recommendation platform in accordance with an embodiment of the present technology.

FIG. 2 is a schematic representation of an electronic device 106 that can be implemented in accordance with at least some embodiments of the present technology. The electronic device 106 comprises a computing unit 200. In some embodiments, the computing unit 200 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 200 comprises various hardware components including one or more single or multi-core processors collectively represented by a processor 210, a solid-state drive 250, a RAM 230, a dedicated memory 240 and an input/output interface 260. The computing unit 200 may be a generic computer system.

In some other embodiments, the computing unit 200 may be an "off the shelf" generic computer system. In some embodiments, the computing unit 200 may also be distributed amongst multiple systems. The computing unit 200 may also be specifically dedicated to the implementation of the present technology. As a person in the art of the present technology may appreciate, multiple variations as to how the computing unit 200 is implemented may be envisioned without departing from the scope of the present technology.

Communication between the various components of the computing unit 200 may be enabled by one or more internal and/or external buses 270 (e.g. a PCI bus, universal serial bus, IEEE 1394 "Firewire" bus, SCSI bus, Serial-ATA bus, ARINC bus, etc.), to which the various hardware components are electronically coupled.

The input/output interface 260 may provide networking capabilities such as wired or wireless access. As an example, the input/output interface 260 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 220 stores program instructions suitable for being loaded into the RAM 230 and executed by the processor 210. Although illustrated as a solid-state drive 250, any type of memory may be used in place of the solid-state drive 250, such as a hard disk, optical disk, and/or removable storage media.

The processor 210 may be a general-purpose processor, such as a central processing unit (CPU) or a processor dedicated to a specific purpose, such as a digital signal processor (DSP). In some embodiments, the processor 210 may also rely on an accelerator 220 dedicated to certain given tasks, such as executing the methods set forth in the paragraphs below. In some embodiments, the processor 210 or the accelerator 220 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 106 may include a screen or display 206 capable of rendering an interface of the recommendation platform 112. In some embodiments, display 206 may comprise and/or be housed with a touchscreen to permit users to input data via some combination of virtual keyboards, icons, menus, or other Graphical User Interfaces (GUIs). In some embodiments, display 206 may be implemented using a Liquid Crystal Display (LCD) display or a Light Emitting Diode (LED) display, such as an Organic LED (OLED) display. The device may be, for example, an iPhone® from Apple or a Galaxy® from Samsung, or any other mobile device whose features are similar or equivalent to the aforementioned features. The device may be, for example and without being limitative, a handheld computer, a personal digital assistant, a cellular phone, a network device, a smartphone, a navigation device, an email device, a game console, or a combination of two or more of these data processing devices or other data processing devices.

The electronic device 106 may comprise a memory 202 communicably connected to the computing unit 200 and configured to store data, settings of the recommendation application 107, or any other information relevant for running the recommendation application 107 on the electronic device 106. The memory 202 may be embedded in the electronic device 106 as in the illustrated embodiment of FIG. 2 or located in an external physical location. The computing unit 200 may be configured to access a content of the memory 202 via a network (not shown) such as a Local Area Network (LAN) and/or a wireless connexion such as a Wireless Local Area Network (WLAN).

The electronic device 106 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Returning to the description of FIG. 1, how the recommendation application 107 is implemented is not particularly limited. One example of the recommendation application 107 may include a given user 20 accessing a web site associated with the recommendation service to access the recommendation application 107. For example, the recommendation application 107 may be accessed by typing in (or otherwise copy-pasting or selecting a link) an URL associated with the recommendation service. Alternatively, the recommendation application 106 may be an application downloaded from a so-called "app store", such as APP-STORE™ or GOOGLEPLAY™ and installed/executed on the electronic device 106. It should be expressly understood that the recommendation application 107 may be accessed using any other suitable means. In yet additional embodiments, the recommendation application 107 functionality may be incorporated into another application, such as a browser application (not depicted) or the like. For example, the recommendation application 107 may be executed as part of the browser application, for example, when the user 20 starts the browser application, the functionality of the recommendation application 107 may be executed.

It should be appreciated that different types of the recommendation application 107 may be transmitted based on the type of electronic device 106. For instance, the smartphone electronic device 106a receives an application 107a configured to operate on a smartphone while the personal computer electronic device 106b receives an application 107b configured to operate on a personal computer. In other embodiments, the recommendation application 107 may operate in conjunction with (or be replaced by) a website hosted by the recommendation server 102 enabling a user of the website to access the recommendation platform 112.

Figure 6:
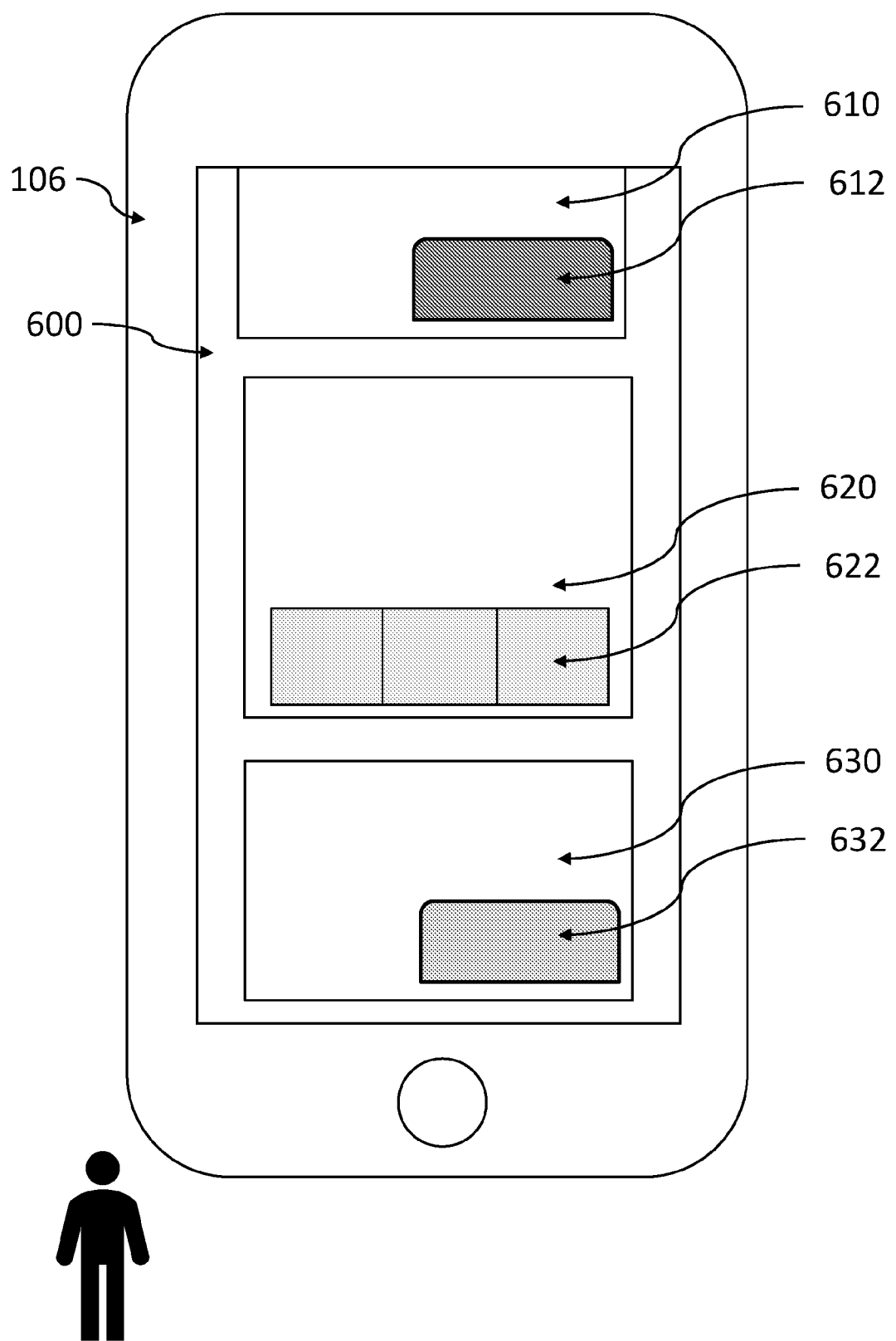
FIG. 6 depicts a representation of an interface of a recommendation interface implemented in accordance with non-limiting embodiments of the present technology.

Generally speaking, the recommendation application 107 comprises a recommendation interface being displayed on a screen of the electronic device 106. With reference to FIG. 6, there is depicted a schematic representation of a recommendation interface 600 of the recommendation application 107 on an electronic device 106 in accordance with a non-limiting embodiment of the present technology (the example of the recommendation interface being depicted as displayed on the screen of the electronic device 106 being implemented as a smart phone).

In some embodiments of the present technology the recommendation interface 600 may be presented/displayed when the user 20 of the electronic device 106 actuates (i.e. executes, run, background-run or the like) the recommendation application 107. Alternatively, the recommendation interface 600 may be presented/displayed when the user 20 opens a new browser window and/or activates a new tab in the browser application. For example, in some embodiments of the present technology, the recommendation interface may act as a "home screen" in the browser application.

The recommendation interface 600 includes displayed recommended digital content. In the illustrative example of FIG. 6, displayed recommendable digital content comprises three recommended digital items 610, 620 and 630. Naturally, the recommended digital content may have more recommended digital items. In the embodiment depicted in FIG. 6 and in those embodiments where more than one recommended digital items are present, the user 20 may scroll through the recommended digital items. The scrolling may be achieved by any suitable means. For example, the user 20 can scroll the content of the recommended digital content by means of actuating a mouse device (not depicted), a key board key (not depicted) or interacting with a touch sensitive screen (not depicted) of or associated with the electronic device 106.

As it will be described in greater details herein after, an organisation of the displayed digital items may depend on a rank of said digital items in a ranked list generated by the server 102 based on user interest. In this illustrative example, the server 102 may be configured to cause the electronic device 106 to display top ranked digital items above lower-ranked digital items. In this embodiment, the digital item 610 is ranked higher in the ranked list than the digital item 620 for the respective user 20. Similarly, the digital item 620 is ranked higher in the ranked list than the digital item 630 for the respective user 20.

In the context of the present technology, at least one digital item displayed to the user 20 may be displayed with an "interface element" for triggering a corresponding action. For instance, an interface element 612 that may be actuated by the user 20 for triggering an action associated with the digital item 610 is displayed with the digital item 610. Similarly, interface element 622, 632 that may be actuated by the user 20 for triggering a respective action associated with the corresponding ones of the digital items 620 and 630 are displayed with the corresponding ones from the digital items 620 and 630.

The interface elements may take various forms. In some embodiments of the present technology, an interface element may be a button, a clickable picture, clickable text, video, or any other suitable elements that may be interacted with by the user 20 for triggering a corresponding action. For instance, the interface elements 612 and 632 may be buttons and the interface element 622 may be a gallery of pictures that may be accessed by the user of the electronic device 106 upon being clicked on.

Returning to the description of FIG. 1, the electronic device 106 may be configured to generate a request for digital content recommendation. The request may be generated in response to the user 20 providing an explicit indication of the user desire to receive a digital content recommendation. For example, the recommendation interface 600 may provide a button (or another actuatable element) to enable the user 20 to indicate her/his desire to receive a new or an updated digital content recommendation.

As an example only, the recommendation interface may provide an actuatable button that reads "Request content recommendation" or "Request Service Provider recommendation". Within these embodiments, the request for content recommendation can be thought of as "an explicit request" in a sense of the user 20 expressly providing a request for the digital content recommendation.

In other embodiments, the request for digital content recommendation may be generated in response to the user 20 providing an implicit indication of the user desire to receive the digital content recommendation. In some embodiments of the present technology, the request for digital content recommendation may be generated in response to the user 20 starting the recommendation application 107.

Alternatively, in those embodiments of the present technology where the recommendation application 107 is implemented as a browser (for example, a GOOGLE™ browser, a YANDEX™ browser, a YAHOO!™ browser or any other proprietary or commercially available browser application), the request for digital content recommendation may be generated in response to the user 20 opening the browser application and may be generated, for example, without the user 20 executing any additional actions other than activating the browser application.

Optionally, the request for digital content recommendation may be generated in response to the user 20 opening a new tab of the already-opened browser application and may be generated, for example, without the user 20 executing any additional actions other than activating the new browser tab.

Therefore, it is contemplated that in some embodiments of the present technology, the request for digital content recommendation may be generated even without the user 20 knowing that the user 20 may be interested in obtaining a digital content recommendation.

Optionally, the request for digital content recommendation may be generated in response to the user 20 selecting a particular element of the browser application and may be generated, for example, without the user 20 executing any additional actions other than selecting/activating the particular element of the browser application.

Examples of the particular element of the browser application include but are not limited to:
- an address line of the browser application bar;
- a search bar of the browser application and/or a search bar of a search engine web site accessed in the browser application;
- an omnibox (combined address and search bar of the browser application);
- a favorite or recently visited network resources pane; and
- any other pre-determined area of the browser application interface or a network resource displayed in the browser application.

How the content for the recommended digital content is generated and provided to the electronic device 106 will be described in greater detail herein further below. It should be appreciated that in other embodiments, the environment 100 can include additional or fewer user devices 106.

Service Provider (SP) Server

Returning to the description of FIG. 1, the system 100 comprises a plurality of servers 108, each server 108 being associated with a respective service provider (SP) 30. As such, the server 108 can sometimes be referred to as a "SP server". Broadly speaking, a given SP may provide services or products to users of the recommendation system 100. In some embodiments, in addition to providing services and/or products, a given SP may generate other digital content such as "posts" for users of the recommendation system. Examples of SP include but are not limited to:
- a person providing products or services such as a designer, an electrician, a contractor, an architect, a decorator, a gardener, etc.;
- a retailer of furniture, pool supplies, gardening supplies, decorative supplies, household appliances, etc.; and
- a manufacturer of products, housebuilders, carpenters, real estate developers, etc.

It should be noted that the fact that the SP servers 108 are associated with a SP 30 does not need to suggest or imply any mode of operation—such as a need to log in, a need to be registered, or the like. Each SP server may be associated with a SP electronic device (not depicted) configured to provide access to a corresponding SP server 108 by the corresponding SP 30. The SP electronic device may have similar or equivalent features to the aforementioned electronic devices 106.

It should be noted that, although only one SP 30 associated with a corresponding SP server 108 is depicted in FIG. 1, it is contemplated that a SP 30 associated with a SP server 108 is a given user from the plurality of SP of the system 100, and where each one of the plurality of SP 30 can be associated with a respective SP server 108.

The SP servers 108 may use the application 107 (or a different provider application) to provide information regarding a product and/or service that is the object of recommendations. The SP servers 108 may also use the application 107 to monitor which users 20 are endorsing and/or engaging with their products/services. The SP servers 108 may also use the application 107 to advertise or otherwise incentivize users into referring their products/services.

In at least some embodiments of the present technology, it is contemplated that a given SP may be configured to generate one or more "posts" for users of the recommendation system 100. In some cases, these "posts" may aid the given SP to raise awareness or attract a broader audience to addition digital content that is available on the respective SP server. For example, the given designer may generate a potentially recommendable digital item in a form of a post about a new designer job that (s)he completed, and the respective SP server may host a website associated with the given designer which comprises additional digital content about the designer.

It should be appreciated that in other embodiments, the environment 100 can include additional or fewer SP servers 108.

Communication Network

The electronic devices 106 and the SP servers 108 are communicatively coupled to a communication network 104 for accessing the recommendation server 102 and the recommendation platform 112 hosted thereby. In some non-limiting embodiments of the present technology, the communication network 104 may be implemented as the Internet. In other embodiments of the present technology, the communication network 110 can be implemented differently, such as any wide-area communication network, local-area communication network, a private communication network and the like.

How a communication link (not separately numbered) between the electronic devices 106, the SP servers 108 and the communication network 104 is implemented will depend inter alia on how the electronic device 106 and the SP servers 108 are implemented. Merely as an example and not as a limitation, in those embodiments of the present technology where an electronic device 106 is implemented as a wireless communication device (such as a smartphone), the communication link between said electronic device 106 and the recommendation server 102 can be implemented as a wireless communication link (such as but not limited to, a 3G communication network link, a 4G communication network link, Wireless Fidelity, or WiFi® for short, Bluetooth® and the like). In those examples where one of the electronic device 106 and/or the SP servers 108 is implemented as a notebook computer, the corresponding communication link can be either wireless (such as Wireless Fidelity, or WiFi® for short, Bluetooth® or the like) or wired (such as an Ethernet based connection).

Database

A database 110 is communicatively coupled to the recommendation server 102. The database 110 is depicted as a separate entity from the server 102. However, it is contemplated that the database 110 may be implemented integrally with the server 102, without departing from the scope of the present technology. Alternatively, functionalities of the database 110 as described below may be distributed between more than one physical devices.

Generally speaking, the database 110 is configured to store data generated, retrieved and/or processed by the server 102 for temporary and/or permanent storage thereof. For example, the database 110 may be configured to store inter alia data for training and using one or more MLAs of the recommendation platform 112. The database 110 may be implemented by any computer-readable medium, including RAM, ROM, flash memory, magnetic or optical disks, optical memory, or other storage media.

The database 110 stores information associated with respective digital items of the recommendation platform 112 under the form of computer-readable data, or "item data".

The item data includes information about respective digital items discovered and catalogued by the server 102. For example, the item data may include a digital content of respective digital items that are potentially recommendable by the recommendation platform 112. In at least some embodiments of the present technology, it can be said that the database 110 stores item data for respective items from a pool of potentially recommendable digital items by the recommendation system 100 to its users.

The item data of a given digital item may include an item vector comprising information representative of one or more characteristics/features of the corresponding digital item. The item vector may for instance comprise values for different predetermined categories of features, each value being representative of a potentially interesting characteristic of the digital item for the corresponding category of potentially interesting characteristic. For instance, the item vector may comprise information indication whether the corresponding digital item is a product or a service, a type of service or product (e.g. carpentry services, electricity work services, furniture products, house, etc.), indication of a price related to the digital item, indication of a SP associated to the digital item, and/or any other indication suitable for being received by the user. The item vector may be used to determine recommendable digital items for each user based on their respective user vectors, as it will be described in greater details herein after.

Figure 3:
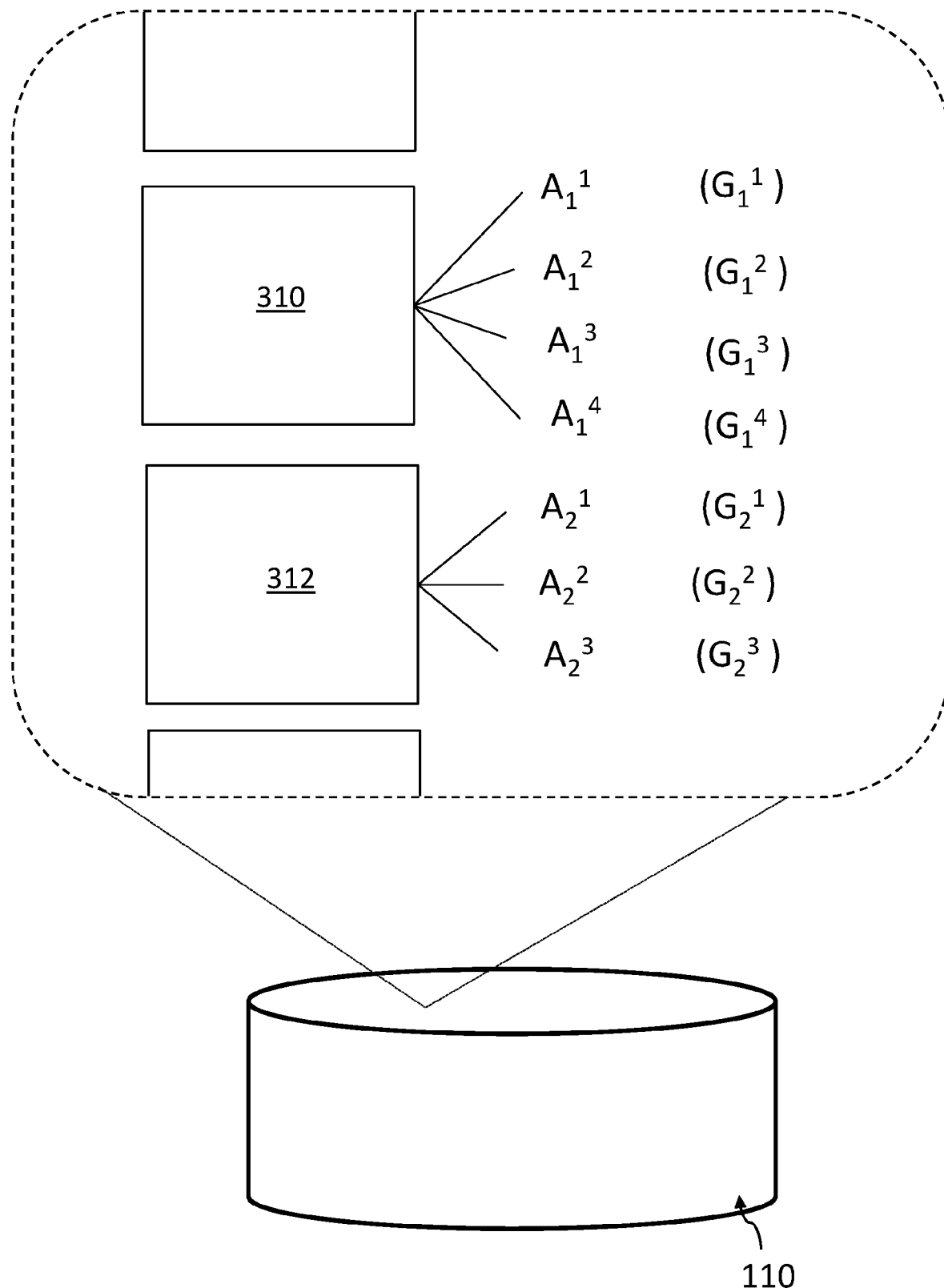
FIG. 3 depicts a representation of data stored by a database of the recommendation environment of FIG. 1 in accordance with non-limiting embodiments of the present technology.

FIG. 3 is a high-level representation of a content of the database 110 in accordance with an embodiment of the present technology. In this embodiment, the database 110 is configured to store digital items, that may be under the form of computer-readable information, configured to be retrieve and/or accessed by the user devices 106 and/or provider servers 108. As an example, a digital item may comprise textual and/or visual information to be displayed on the recommendation application 107, such as a post, a comment, a picture, a gallery of pictures, a video, or any other form of digital item suitable for being displayed on the recommendation platform 112. In this embodiment, each digital item may be associated with a plurality of actions triggerable by the users of the recommendation platform 112. Each triggerable actions may be further associated with a respective SP registered on the recommendation platform 112 and/or another digital item stored in the database 110. For instance, if a SP generates a digital item (e.g. a post), an action associated with said digital item may be to send a message to the SP, or send a request to add the SP to the personalized network of the user triggering the action. A list of actions associable to a digital item may be predetermined based on a category of the digital item. Therefore, when a user or a SP generates a digital item in the recommendation platform, a list of actions may be automatically associated with the digital item in the database 110. Actions associated with the digital items may be comprised in the item data of the corresponding digital item. In an embodiment, a type of actions to be associated with a given digital item may be pre-determined by a SP associated with the given digital item. For instance, upon publication of a post, a SP may indicate that he/she does not desire to be reached out by users 20 via emails. Therefore, triggerable actions associated with his/her publication may not comprise a triggerable action causing the user to reach out the SP via email.

FIG. 3 depicts two digital items 310, 312 stored in the database 110. The first digital item 310 is associated with four actions: $A_1^1, A_1^2, A_1^3$ and $A_1^4$. For example, the digital item 310 may be a picture of a house that is on sale. The action $A_1^1$ may cause, upon being triggered, the user to visit a website of a designer that designed the house, the corresponding digital sub-item being a link to said website (hosted on a respective SP server, for example). The action $A_1^2$ may cause, upon being triggered, the user to engage a chat conversion with the carpenter that provided carpentry services for this house, the corresponding digital sub-item being a chat box enabling said chat conversation. The action $A_1^3$ may cause, upon being triggered, display of pictures of a kitchen of the house to the user, the corresponding digital sub-item being a gallery of pictures of said kitchen and the digital item corresponding to said house. In this example, it can be said that "specialized content" provided to the user upon triggering an action may be hosted by a given SP server (e.g., user being redirected to a website), but may also be stored in the database 110 as the digital sub-item (e.g., user being redirected to another digital content item from the database 110). The action $A_1^4$ may cause, upon being triggered, the user to being displayed with a profile and/or contact information of a SP that provided a service for the house, the corresponding digital sub-item being a profile of said SP.

In the illustrative example of FIG. 3, the second digital item 312 is associated with three actions: $A_2^1$, $A_2^2$, and $A_2^3$. For example, the digital item 312 may be a textual post published by a SP on the recommendation platform 112. The action $A_2^1$ may cause, upon being triggered, the user to being displayed a profile and/or contact information of the SP that published the textual post; the action $A_2^2$ may cause, upon being triggered, the user to being displayed a first set of pictures of a service provided by the SP; and the action $A_2^3$ may cause, upon being triggered, the user to being displayed a second set of pictures of a service provided by the SP.

In a more general aspect, the digital items and their corresponding triggerable actions may be stored under the form of "digital item-action pairs" in the database 110, where each digital item-pair comprises a digital item and one of its associated triggerable actions. As such, a digital item-action pair comprises information comprised in the respective item vector and action vector. Moreover, in the case where the triggerable action is associated with a SP, the database 110 may be configured to store digital item-action-SP triplets, without departing from the scope of the present invention, comprising information about the digital item (e.g. item vector), the triggerable action (e.g. action vector) and the SP (e.g. SP vector) described in greater details herein further below.

In this embodiment, each action is associated with an expected gain representative of an outcome of the corresponding action. The expected gain associated with each probability may be set to represent a potential gain of the user and/or a SP associated with the corresponding action. The potential gain may represent financial gain, a level of engagement, or any other metric that may relevant to characterize a quality of the action. For example, if a first action, upon being triggered by a user, results in being displayed a house at a first price, and a second action upon being triggered by the user, results in being displayed a piece of carpentry at a second price, the second price being lower than the first price, the expected gain of the first action may be set higher than the expected gain of the second action. In one embodiment, the expected gain of an action may be determined by the server based on a description of the corresponding digital item and/or a digital item that is retrieved and display to the user upon triggering the corresponding action.

The expected gain may or may not by conditioned, for each user of the recommendation platform, by the corresponding user vector representing the user's interests. In the illustrative example of FIG. 3, each of the actions $A_1^1$, $A_1^2$, $A_1^3$, $A_1^4$, $A_2^1$, $A_2^2$, and $A_2^3$ are respectively associated with an expected gain $G_1^1$, $G_1^2$, $G_1^3$, $G_1^4$, $G_2^1$, $G_2^2$, and $G_2^3$.

In some embodiments, each triggerable action is associated, for each user 20 based on their respective user vector, with a probability of being triggered by a corresponding user 20. Determination of said probability is described in greater details herein further below.

Returning to the description of FIG. 1, the nature of digital content that is potentially recommendable by the server 102 is not particularly limited. Some examples of digital content that is potentially recommendable by the server 102 include, but are not limited to, digital items such as:
  a picture of a gallery of pictures;
  a profile and/or information of one or more SPs;
  a product and/or service description;
  a news article;
  a publication;
  a web page; and
  a post on a social media web site.

It is contemplated that the item data of a given digital item may comprise information about actions associated therewith. For instance, the item data of a digital item may comprise a list of actions associated therewith, each triggerable action being associated with its corresponding expected gain. In some non-limiting embodiments of the present technology, the item data of a digital item may comprise raw textual data from respective digital item. This means that the server 102 may be configured to parse a given digital content item, extract (raw) textual content from that item and store it in association with that item as part of the item data.

In other non-limiting embodiments, the item data may comprise information about one or more item features associated with respective digital content items. For example, the database 110 may store data associated with respective items indicative of, but not limited to:
  popularity of the given digital item;
  click-through-rate for the given digital item and/or a triggerable action associated thereto;
  time-per-click associated with the given digital item and/or a triggerable action associated thereto;
  other statistical data associated with the given digital item and/or a triggerable action associated thereto; and
  others.

In addition to the data non-exhaustively listed immediately above, the database 110 may store metadata associated with a given digital item such as, for example, a description of the digital item (text, images, and/or videos). At least some of the metadata may be acquired by the server 102 (and stored in the database 110) from a third-party server, such as one of the SP servers 108. It is also contemplated that the database 110 may store additional features about a given digital item that have been extracted from the information associated with the given digital item via known techniques. In addition to the data non-exhaustively listed immediately above, the database 110 may information about adoption metrics for the given digital item. Adoption metrics may be representative of an average engagement with the given digital item by the users 20 (adoption metrics may include for example, and without limitation, number of users 20 that "scrolled-over", "liked", "shared", "clicked" the given digital item).

In additional embodiments of the present technology, the database 110 may be populated with additional information about the plurality of users 20 and SP 30 of the recommendation platform 112, hereinafter referred to as user data and SP data respectively. For example, the server 102 may be configured to collect and store in the database 110 user-profile data associated with respective users of the recommendation platform 112 such as, but not limited to: name, age, gender, purchase history, endorsed SPs, personalized network for each user, demographic/geographic parameters for each user, endorsed products/services for each user, digital items, user-selected types of digital content that (s)he desires, and the like. Other information about the plurality of users of the recommendation service may also be stored in the database 110 as part of the user data, without departing from the scope of the present technology.

As it will become apparent from the description herein further below, the server 102 may be configured to store (as part of the user data) in the database 110 one or more user vectors of one or more types associated with respective users of the recommendation platform 112, a user vector of a given user may comprise information indicative of user behavior and/or user interests. As mentioned above, the server 102 may be configured to use the one or more MLAs of the recommendation platform for generating user vectors (of different types) and may then store them in the database 110 for further processing. For example, the server 102 may be configured to generate and store user vectors in off-line mode of the recommendation platform 112, and then retrieve them for further processing during the on-line mode of the recommendation platform 112. The server 102 may generate one or more user vectors by employ a variety of embedding algorithms. Just as examples, one or more embedding algorithms executed by the server 102 may employ computer-implemented techniques such as Singular Value Decomposition (SVD), user profiling for web page filtering, Principal Component Analysis (PCA), and the like. In at least some embodiments, one or more embedding algorithms may be implemented as trained MLAs. For example, a given embedding algorithm may be implemented via a hidden markov model, a Recurrent Neural Network (RNN), a Gated Recurrent Unit (GRU), and the like.

In some embodiments of the present technology, the database 110 may also be configured to store information about interactions between digital content items and users. For example, the server 102 may track and gather a variety of different user-item interactions between users and previously recommended digital items.

For example, let it be assumed that a given user interacted with a given digital item being a given digital item previously recommended thereto via the recommendation platform. As such, the server 102 may track and gather user-item interaction data of the given user with the given digital item in a form of user events that occurred between the given user and the given digital item. Examples of different types of user events that may be tracked and gathered by the server 102 may include, but are not limited to:
  the given user "scrolled over" the given digital item;
  the given user "liked" the given digital item;
  the given user "disliked" the given digital item;
  the given user "shared" the given digital item;
  the given user "clicked" or "selected" the given digital item;
  the given user spent an amount of "interaction time" consulting the given digital item; and
  the given user purchased/ordered/downloaded the given digital item.

Similarly, as it will become apparent from the description herein further below, the server 102 may be configured to store (as part of the SP data) in the database 110 one or more SP vectors of one or more types associated with respective SP of the recommendation platform 112, a SP vector of a given SP may comprise information indicative of SP behavior and/or SP interests. As mentioned above, the server 102 may be configured to use the one or more MLAs of the recommendation platform for generating SP vectors (of different types) and may then store them in the database 110 for further processing. For example, the server 102 may be configured to generate and store SP vectors in off-line mode of the recommendation platform 112, and then retrieve them for further processing during the on-line mode of the recommendation platform 112. Just as an example, the server 102 may employ the aforementioned embedding algorithms.

In some embodiments of the present technology, the database 110 may also be configured to store information about interactions between SP and users. For example, the server 102 may track and gather a variety of different SP-user interactions between SP and users and that previously engaged with the SP and/or SP-item interactions between SP and digital items.

For example, let it be assumed that a given SP 30 interacted with a given user 20 via the recommendation platform. As such, the server 102 may track and gather SP-user interaction data of the given SP 30 with the given user 20 and/or the given digital item in a form of SP 30 events that occurred between the given SP 30 and the given user 20 and/or the given digital item respectively. Examples of different types of SP events that may be tracked and gathered by the server 102 may include, but are not limited to:
  the given SP "interacted" with the given user;
  the given SP spent an amount of "interaction time" with the given user;
  the given SP sent a service offer to the given user;
  the given SP received an acceptance of an offer for a service to the given user
  the given SP "scrolled over" the given digital item;
  the given SP "liked" the given digital item;
  the given SP "disliked" the given digital item;
  the given SP "shared" the given digital item;
  the given SP "clicked" or "selected" the given digital item;
  the given SP spent an amount of "interaction time" consulting the given digital item; and
  the given SP purchased/ordered/downloaded the given digital item.

Recommendation Server

The server 102 may be implemented as a conventional computer server. In an example of an embodiment of the present technology, the server 102 may be implemented as a Dell™ PowerEdge™ Server running the Microsoft™ Windows Server™ operating system. Needless to say, the server 102 may be implemented in any other suitable hardware, software, and/or firmware, or a combination thereof. In the depicted non-limiting embodiments of the present technology, the server 102 is a single server. In alternative non-limiting embodiments of the present technology, the functionality of the server 102 may be distributed and may be implemented via multiple servers.

Generally speaking, the server 102 is configured to (i) receive from an electronic device 106 request for digital item recommendation from a given user and (ii) responsive to the request 150, generate a ranked list of recommendable digital items based on user data of the given user to be transmitted to the electronic device 106.

The server 102 includes one or more processors configured to manage access and interaction of the users and/or SPs with the recommendation platform. In order to ease an understanding of the present disclosure, each of the one or more processors of the server 102 is associated with a function but said functions may be performed by a single processor or a different number of processors in alternative embodiments. This aspect is not limitative.

For example, in this embodiment, the server 102 comprises a feed generator processor 120, a digital item determination processor 130 and an endorsement processor 140. The server 102, in conjunction with the processors 120, 130 and 140, is configured to host or otherwise provide one or more digital content that are accessed by the user devices 106 and/or the provider servers 108 while using the recommendation platform. In other instances, the server 102 may manage the deployment and operation of the recommendation application 107 (e.g., an App) that is provided to the user devices 106 and/or the provider servers 108. The recommendation application 107 provides a remote operational interface for user and/or SP to request, respond, or otherwise provide digital content.

In this embodiment, the digital item determination processor 130 is configured to generate a ranked list of digital item-action pairs based on user data of said given user, and item data and action data associated with the respective item-action pairs, the ranked list of digital item-action pairs being provided as recommended content to the user as it will be described in greater details herein after. A ranking of the digital item-action pairs is described in greater details herein after. The ranked list of digital item-action pairs may be further transmitted to the feed generator processor 120 to be displayed to the user.

The feed generator processor 120 is configured to generate feed data based on the ranked list of digital item-action pairs, for a given user 20, to be transmitted to the corresponding user device 106, the feed data being rendered on the user device 106 causing the user devices to display the ranked list of digital item-action pairs. The digital item determination processor 130 is configured to select digital items and/or combinations of digital item/action to be transmitted to the feed generator processor 120 for each user.

The endorsement processor 140 is configured to manage personalized network of the users and receive endorsements of SPs 30 by the users 20. In an embodiment, each user may provide endorsements directed to one SP that provided a service for said user. Endorsements may be stored under the form of endorsement data in the database 110. The endorsement data may include structured endorsement data indicative of endorsement scores provided by the users that belong to the personalized network of the user. For example, a user that was provided a service by an electrician (the SP) may rate one characteristics associated with the electrician: electricity skills, communication, pricing, or any other characteristics that may be relevant for other users that may desire to work with said electrician. The endorsement data may also include unstructured endorsement data indicative of at least one of textual and visual information provided by the users of the personalized network for the endorsed SP. For instance, when a user of the personalized network, referred to hereafter as "contact", generate a gallery of pictures for showing results of a service provided by an SP, or comments a digital item generated by the SP, said gallery of pictures and/said comment is identified as endorsement data for that SP.

Therefore, for each user and based on its associated personalized network, the endorsement processor 140 may configured to rank SPs that are endorsed by its "contacts" into a ranked list of SPs based on user data indicative of information about the user and the endorsement data for the endorsed SPs. An illustrative example of a ranking of the endorsed SPs is explained in greater details hereinafter.

Figure 4:
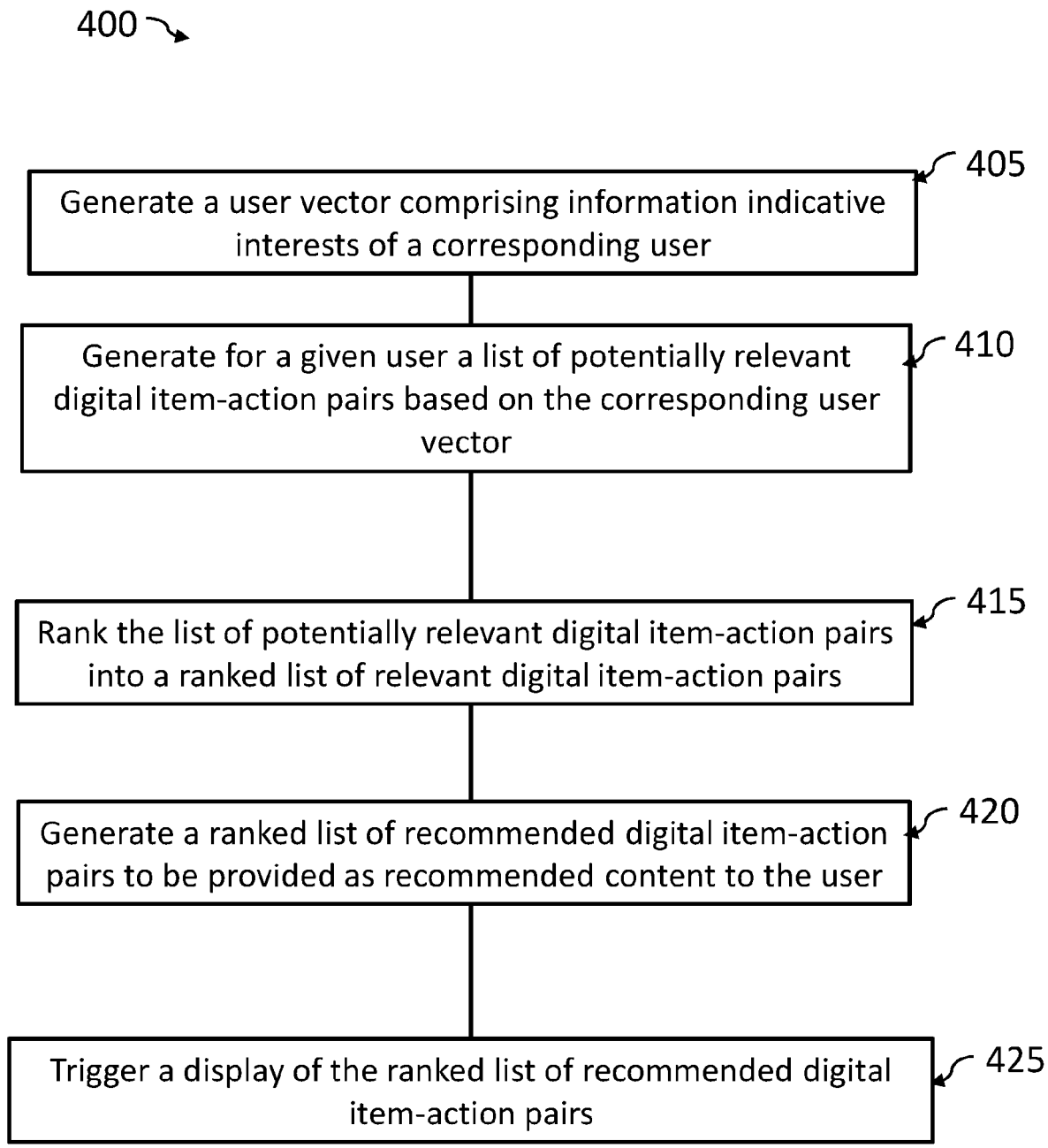
FIG. 4 illustrates a flow diagram showing operations of a method for displaying digital items to a user based on interests of the user in accordance with non-limiting embodiments of the present technology.

FIG. 4 is a flow diagram of a method 400 for displaying digital items to a user based on the user's interests according to some embodiments of the present technology. In one or more aspects, the method 400 or one or more steps thereof may be performed by a computing unit or a computer system, such as the server 102. The method 400 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 405: Generating a User Vector Comprising Information Indicative of Interests of a Corresponding User At step 405, the server 102 is configured to access user data corresponding to a given user 20. Based on the user data of the given user 20, the server 102 may be configured to generate a user vector representative of the interests of the user 20. To establish the user data, the server 102 may be configured to collect information of digital items looked for by the user on a corresponding electronic device 106, transmit a form to be filled by the user to collect information regarding the user's interest, collect information about history of navigation of the user on the recommendation platform, or any other suitable manner for collecting information about the user's behavior and interest. The user vector may comprise values for different predetermined categories of interests (e.g. 'buying a house', 'selling a house', 'carpentry services', 'design services', buying a swimming-pool', etc.), each value being representative of an interest of the user for the corresponding category of interest. The values of the user vector may be updated when corresponding user data are updated. As an example, the server 102 may employ one or more aforementioned embedding algorithms for generating one or more user vectors associated with a given user.

The server 102 may also be configured to access item data corresponding to digital items stored in the database 110 at step 405. Based on the item data of a given digital item, the server 102 may be configured to generate an item vector comprising information indicative of one or more characteristics/features of the corresponding digital item. As an example, the server 102 may employ one or more aforementioned embedding algorithms for generating one or more item vectors associated with a given item. Item vectors of the digital items may be used by the server 102 in the following step 410.

Step 410: Generating, for a Given User, a Set of Potentially Relevant Digital Item-Action Pairs At step 410, the server 102 is configured, for the given user 20, to determine the digital item-action pairs combinations that are to be recommended to the user, based on at least in part the user vector comprising information indicative of the user's interests.

In some embodiments, the digital item determination processor 130 may first generate a set of potentially relevant digital items for the given user 20, the potentially relevant digital items being selected from a pool of potentially recommendable digital items. As an example only, the pool of potentially recommendable digital items may comprise the digital items stored in the database 110. The digital item determination processor 130 may further select potentially relevant digital items for the given user based on the user vector and the item vectors of the digital items in the pool of potentially recommendable digital items.

For instance, the digital item determination processor 130 may be configured to determine the set of potentially relevant digital items based on a matching between the user vector and the item vectors of the digital items from the pool of potentially recommendable digital items. For instance, the set of potentially relevant digital items may comprise digital items having a dot product of their item vector and the user vector above a predetermined threshold. In this example, the user and item vectors may be generated in a manner that would result in potentially relevant items having a higher dot product between its item vector and the user vector than the other item vectors that are less relevant.

Once the digital item determination processor 120 generates the set of potentially relevant digital items, the digital item determination processor 130 may be configured to retrieve the triggerable actions associated to each of the potentially relevant digital item of the set of potentially relevant digital items. The digital item determination processor 130 may thus generate a set of potentially relevant digital item-action pairs, each digital item-action pair comprising a digital item from the set of potentially relevant digital items and one of its associated triggerable action. A given digital item-action pair thus may be associated with item data of the corresponding digital item and action data of the corresponding triggerable action. For instance, the item data of a given digital item from the set of potentially relevant digital items may be associated with two distinct triggerable actions. This given digital item may hence be associated with two distinct digital item-action pairs, each of the two digital item-action pairs further being associated with action data of the respective ones from the two triggerable actions.

Step 415: Ranking the Set of Potentially Relevant Item-Action Pairs into a Ranked List of Potentially Relevant Item-Action Pairs At step 415, the server 102 is configured to determine, for each digital item-action pair of the set of potentially relevant digital item-action pairs generated at step 410, a probability of a given user interacting with the digital item associated with the respective action. The server 102 may further rank the digital item-action pair based on their respective probabilities by using them as ranking scores. In some cases, the server 102 may weigh a respective probability by the respective expected gain for generating a ranking score for the respective digital item-action pair.

In this embodiment, each digital item-action pair is thus associated with probability of being triggered by a user, each probability being conditioned, for each user of the recommendation platform, by the corresponding user vector representing the user's interests.

If determination is made that a given digital item is to be recommended to a first user, namely the given digital item belongs to the set of potentially relevant item-action pairs, the server 102 may be configured to determine the probabilities of each triggerable action associated to said digital item based on the user vector, the respective item vector, and the respective action vector. As the user vector may be updated upon collecting information about a user's behavior and/or user's interests, the probabilities may thus determined based on the updated user vectors. Therefore, the probabilities are "generated" for a digital item-action pair based on a user vector whenever said digital item is found to belong to the set of potentially relevant item-action pairs for a user associated with said user vector.

In some embodiments of the present technology, the server 102 may employ a Machine Learning Algorithm (MLA) for determining the probabilities for (i) a given user and (ii) a respective digital item-action pair. More specifically, the server 102 may be configured to train the MLA to determine a probability of being triggered by a given user for each digital item-action pair based on the user vector of the given user, the item vector of the respective item, the action vector of the respective action, and the expected gain associated to the respective action of the digital item-action pair.

In this embodiment, the server 102 may be configured to generate a training set for training the MLA. The training set may comprise a first training item dataset and a second training item dataset. Each of the first and second training item dataset may comprise information indicative of a training digital item with a first and a second actions respectively, each action being associated with its corresponding excepted gain. Therefore, the first training item dataset comprises the digital item associated with the first action, and the second training item dataset comprises the digital item associated with the second action. The training set may also comprise a training user dataset indicative of information about a training user, such as the corresponding user vector comprising information indicative of the user's interests. The training set may further comprise a training label indicative of that previously displaying the training item from the first training item dataset to the training user resulted in more user engagement than previously displaying the training item from the second training item dataset. The engagement of the user with an action may be assessed based on different metrics such as detecting whether the user triggered the triggerable action, a duration of an interaction of the user with a digital item whose display was caused by a trigger of the triggerable action (e.g. time spent on a website whose access was triggered by the action), or any other metric suitable for assessing an engagement of the user of the triggerable action.

In this embodiment, the MLA may be trained based on the training set to predict a first probability for the first action from the first training item dataset and a second probability for the second action from the second training item dataset. More specifically, the MLA may be trained to predict that the first probability is higher than the second probability when the label is indicative of higher user engagement of the user with the first action than engagement with the second action. Such engagement data may be collected during a training period where the user is presented with a given item associated with a first interface element indicative of a first action and with the given item associated with a second interface element indicative of a second action, and where user interaction with the first interface element and the second interface element is collected, analyzed, and stored.

Figure 5:
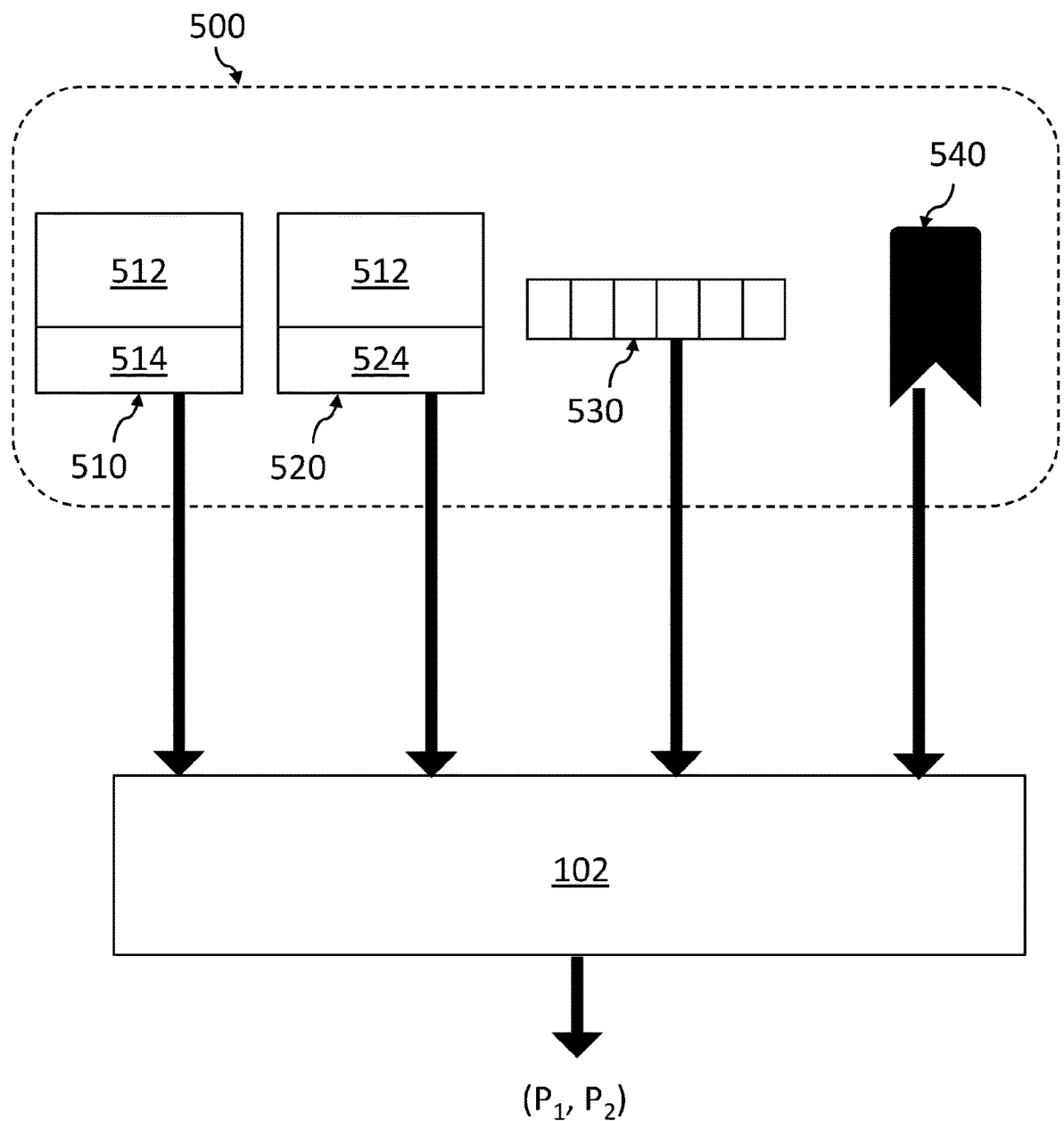
FIG. 5 depicts a representation of how an MLA is train to predict a probability associated with a triggerable action in accordance with non-limiting embodiments of the present technology.

As it will become apparent from the description herein further below, with reference to FIG. 5, the training set 500 for the aforementioned MLA may comprise a first digital item-action pairs 510 comprising a first digital item 512 and a first triggerable action 514, the first triggerable action 514 being associated with the first digital item 512 in the database 110. The training set 500 for the aforementioned MLA may also comprise a second digital item-action pairs 520 comprising the first digital item 512 and a second triggerable action 524, the second triggerable action 524 being also associated with the first digital item 512 in the database 110. The training set further comprises a user vector 530 comprising information representative of interests of the training user, and a training label 540 indicative of which of the first and second triggerable actions 514, 524 has been the most interacted with by the training user.

The server 102 may thus be trained to determine a probability, for each of the triggerable actions, of being triggered by a given user based on the associated user vector.

In alternative embodiment, the server 102 may be trained to determine probabilities associated with each digital item-action pair independently from the associated excepted gain without departing from the scope of the present technology. Therefore, the probabilities may be subsequently weighted by their associated expected gain at step 415. The server 102 may be configured to rank the digital item-action pairs according to their said weighted probabilities. As an example, a given digital item may have two associated triggerable action. In a first digital item-action pair comprising a first triggerable action, the first triggerable action may, upon being triggered, cause the user to be displayed pictures of a swimming pool on sale having a first price. In a second digital item-action pair comprising a second triggerable action, the second triggerable action may, upon being triggered, cause the user to be displayed a wood table on sale having a second price, the second price being lower than the first price. In this example, the server 102 may determine, based on the user vector interests, that the user is more likely to buy the wood table. However, as the expected gain of the first triggerable action is higher than the expected gain of the second triggerable action (e.g. the expected gains may be representative of the prices of the swimming pool and the wood table), the server may identify the second triggerable action as having a higher weighted probability than the first triggerable action.

Step 420: Generating a Ranked List of Recommended Digital Item-Action Pairs to be Provided as Recommended Content to the User by Determining a Highest Ranked Digital Item-Action Pair for a Respective Digital Item in the Ranked List of Potentially Relevant Item-Action Pairs At step 420, the server 102 may generate a ranked list of recommended digital item-action pairs to be provided as recommended content to the user. To do so, the server 102 may be configured to determine, for each digital item of the set of potentially relevant digital items, the highest ranked digital item-action pair for that digital item.

The server 102 may further generate a ranked list of recommended digital item-action pairs comprising only the highest ranked digital item-action pair for each digital item of the set of potentially relevant digital items. Therefore, in this embodiment, the digital item-action pair in the ranked list of recommended digital item-action pairs corresponds to the digital item-action pair having the highest associated probability for that digital item. The triggerable action associated with the digital item-action pairs of the ranked list of recommended digital item-action pairs may be referred to as the "the highest engagement expectancy action" for the corresponding digital item. Indeed, the digital item-action pair having the highest associated probability correspond to the triggerable action that has the highest chance of being triggered by the given user based on its associated expected gain.

In some embodiments, it can be said that digital item-action pairs that does not have the highest probability in the ranked list of potentially relevant item-action pairs are "excluded" from said ranked list, the ranked list of potentially relevant item-action pairs thereby forming the ranked list of recommended digital item-action pairs to be provided as recommended content to the user.

Step 425: Triggering a Display of the Ranked List of Recommended Digital Item-Action Pairs At step 425, the server 102 is configured to cause a display of the ranked list of recommended digital item-action pairs on the user device. More specifically, the digital item determination processor 130 may transmit the ranked list of recommended digital item-action pairs to the feed generator processor 120, each digital item being thus associated with its respective highest engagement expectancy action. The feed generator processor 120 may further cause the user device 106 to display top-ranked digital items of the ranked list, along with their respective highest engagement expectancy action. The user may further scroll down and/or, more generally, access subsequently ranked digital items of the ranked list of recommended digital item-action pairs (see, for example, FIG. 6).

Figure 7:
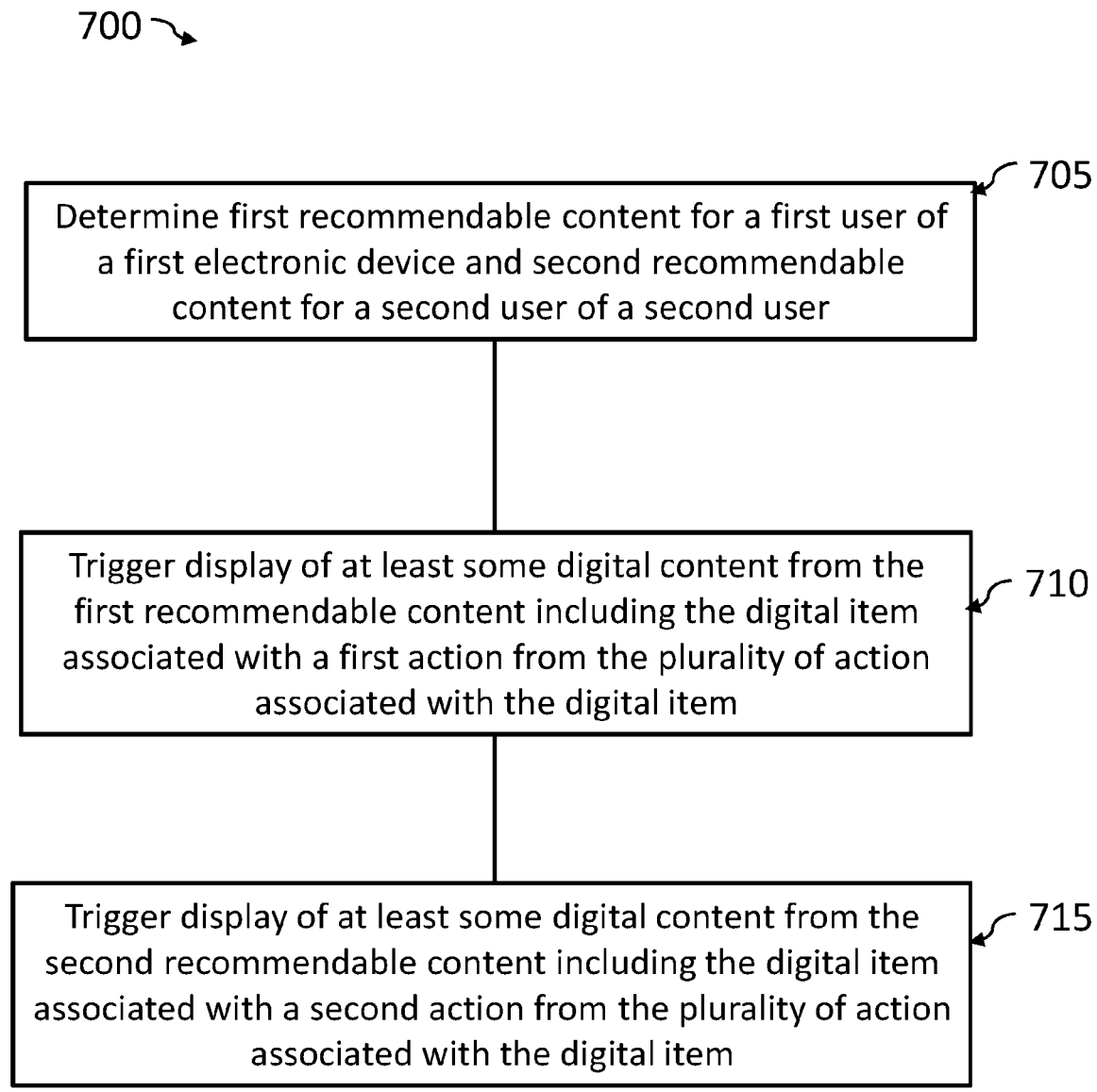
FIG. 7 illustrates a flow diagram showing operations of a method for displaying a digital item to two distinct users of a recommendation platform in accordance with non-limiting embodiments of the present technology.

FIG. 7 is a flow diagram of a method 700 for displaying a digital item to users of the recommendation system 100 according to some embodiments of the present technology. In one or more aspects, the method 600 or one or more steps thereof may be performed by a computing unit or a computer system, such as the server 102. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 705: Determine First Recommendable Content for a First User of a First Electronic Device and Second Recommendable Content for a Second User of a Second User At step 705, the server 102 may determine first recommendable content for a first user of a first electronic device and second recommendable content for a second user of a second user by generating a first ranked list of recommended digital item-action pairs to be provided as first recommended content for a first user of a first user device and a second ranked list of recommended digital item-action pairs to be provided as a second recommendable content for a second user of a second user device. The server 102 may perform steps of the aforementioned method depicted in FIG. 4 for each of the first and second users to determine the corresponding first and second recommendable contents. In this embodiment, the first and second recommendable contents may comprise a digital item-action pair comprising a same given digital item from the database 110 identified by the server 102 as a recommendable digital item for the first user and the second user. Therefore, the first and second recommendable content include the digital item. However, highest engagement expectancy actions associated with said digital item may be different for the first and second user. For instance, the recommendable content for the first user may comprise a first digital item paired with a first triggerable action from the plurality of actions associated with the first digital item, the first triggerable action having been identified as the highest engagement expectancy action for the first user, based on a first user vector comprising information representative of the first user's interests. Similarly, the second recommendable content may comprise the first digital item paired with a second triggerable action from the plurality of actions associated with the first digital item, the second triggerable action having been identified as the highest engagement expectancy action for the second user, based on a second user vector comprising information representative of the second user's interests.

Step 710: Trigger Display of at Least Some Digital Content from the First Recommendable Content Including the Digital Item Associated with a First Action from the Plurality of Actions Associated with the Digital Item At step 710, the server 102 may trigger display of at least some recommendable content from the first recommendable content on the first user device. More specifically, the feed generator processor 120 may be configured to render digital items and triggerable actions of digital item-action pairs of the first ranked list of recommended digital item-action pairs on the first user device, the first ranked list of recommended digital item-action pairs having been generated by the digital item determination processor 130 based on the first user vector. Therefore, the given digital item is associated with a first action in a recommended digital item-action pairs of the first ranked list of recommended digital item-action pairs, the first action having been selected from the plurality of actions based on information about the first user, namely the user vector.

Step 715: Trigger Display of at Least Some Digital Content from the Second Recommendable Content Including the Digital Item Associated with a Second Action from the Plurality of Actions Associated with the Digital Item At step 715, the server 102 may trigger display of at least some recommendable content from the second recommendable content on the second user device. More specifically, the feed generator processor 120 may be configured to render digital items and triggerable actions of digital item-action pairs of the second ranked list of recommended digital item-action pairs on the second user device, the second ranked list of recommended digital item-action pairs having been generated by the digital item determination processor 130 based on the second user vector. Therefore, the given digital item is associated with a second action in a recommended digital item-action pairs of the second ranked list of recommended digital item-action pairs, the second action having been selected from the plurality of actions based on information about the second user, namely the user vector.

Therefore, the first and second user may be displayed a same digital item with distinct interface elements configured to trigger distinct actions associated with the digital item. More specifically, the first action triggerable by the first user is distinct from the second action triggerable by the second user on the digital item displayed to both of the first and second users.

Figure 8:
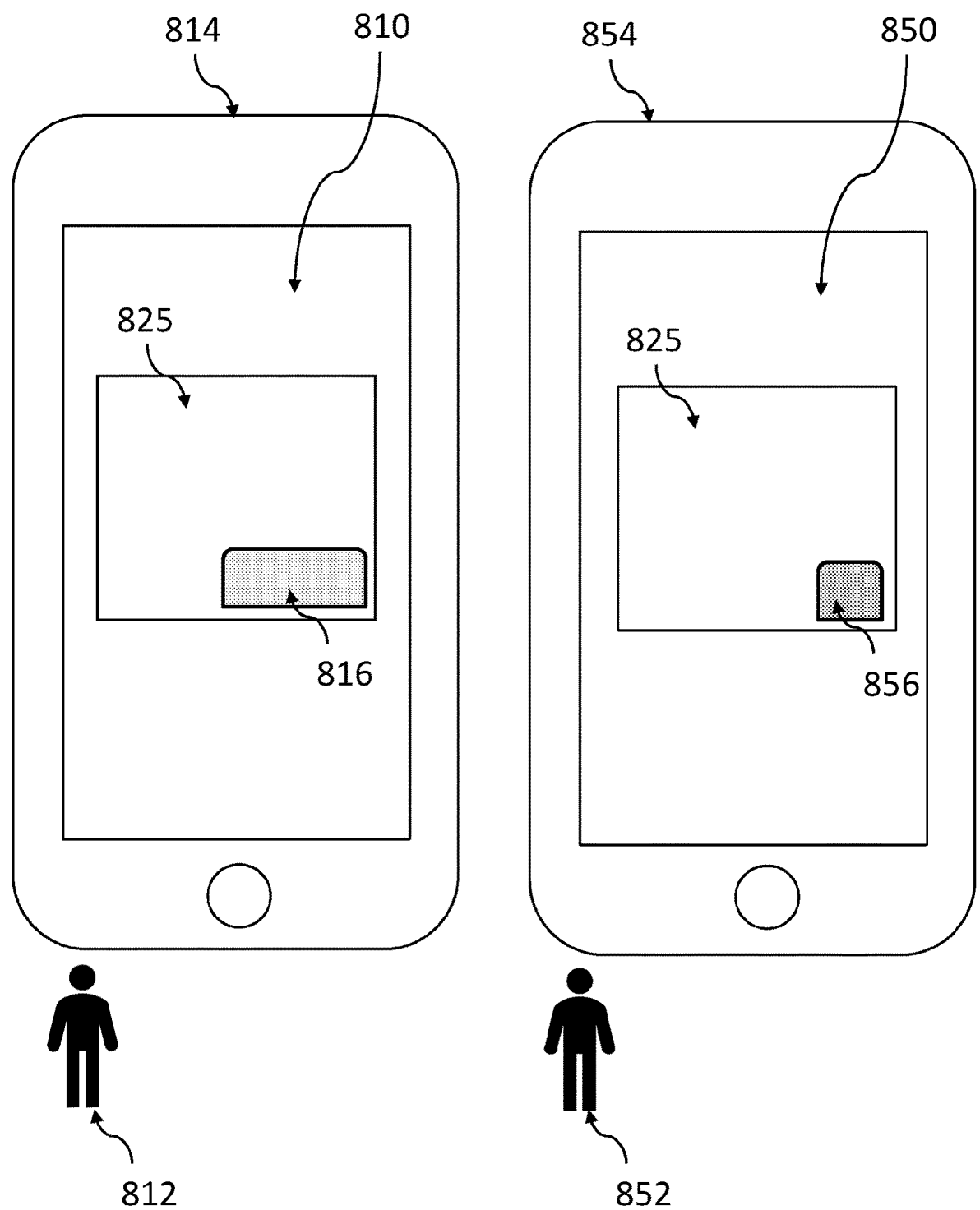
FIG. 8 is a representation of interface of a recommendation interface implemented on two distinct user devices associated with two distinct users in accordance with non-limiting embodiments of the present technology.

FIG. 8 is a high-level schematic representation of a first interface 810 and a second interface 850 of the recommendation platform, each interface being associated with a distinct user, in accordance with an embodiment of the present technology. In FIG. 8, a first user 812 is associated with a respective first user device 814, and a second user 852 is associated with a respective second user device 854. The first and second user 812, 852 have two distinct user data as they are considered to be two distinct people having distinct interests.

In this embodiment, the server 102 may determine that a first digital item 825 belongs to a first recommendable content for the first user 812 and for the second user 852. As they have distinct interests, a highest engagement expectancy action of the first digital item for the first user 812 may be different than a highest engagement expectancy action of the first digital item for the second user 852. The highest engagement expectancy action of the first digital item for the first user 812 will be referred to as "first highest engagement expectancy action" and the highest engagement expectancy action of the first digital item for the second user 852 will be referred to as "second highest engagement expectancy action" for clarity of the present disclosure.

Therefore, the feed generator processor 120 may be configured to cause the first device 814 to display the first digital item on the first interface 810 along with the first highest engagement expectancy action to the first user 812, and to cause the second device 854 to display the first digital item on the second interface 820 along with the second highest engagement expectancy action to the second user 852.

In this embodiment, the first and second highest engagement expectancy actions are displayed under the form of a first and a second interface elements 816, 856 respectively that may be buttons, clickable texts, videos or any other interface elements. In other words, the first and second users 812, 852 may be displayed the same digital item 825 associated with distinct first and second interface elements 816, 856 respectively that, upon being triggered, cause the first and second users 812, 852 to trigger distinct actions that have been selected among actions associated with the digital item 825 based on the first and second user interests respectively. In this embodiment, the first and second interface elements 816, 856 may have distinct appearance. For instance, the first interface element 816 may be a button having a first shape and/or a first color while the second interface element 856 may be a button having a different shape and/or a different color. As another example, the first interface element 816 may be a button while the second interface element 856 may be a gallery of pictures.

Even though, on FIG. 8, the first and second user devices 814, 854 are depicted as similar smartphones, it is contemplated that the first and/or the second user devices 714, 754 may be laptops, tablets, or any other electronic devices. In the case where the first and second user devices 812, 852 are distinct sort of electronic devices, the feed generator processor 120 may cause the first and/or the second user devices 814, 854 to render the interface of the recommendation platform in a distinct manner. However, as the first and second user 812, 852 are associated with distinct interests, not only the interfaces 810, 850 of the recommendation platform 112 is rendered differently on the first and second user devices 814, 854, but digital content displayed, notably interface elements causing highest engagement expectancy action to be triggered, on the first and second user devices 814, 854 is also different.

Figure 9:
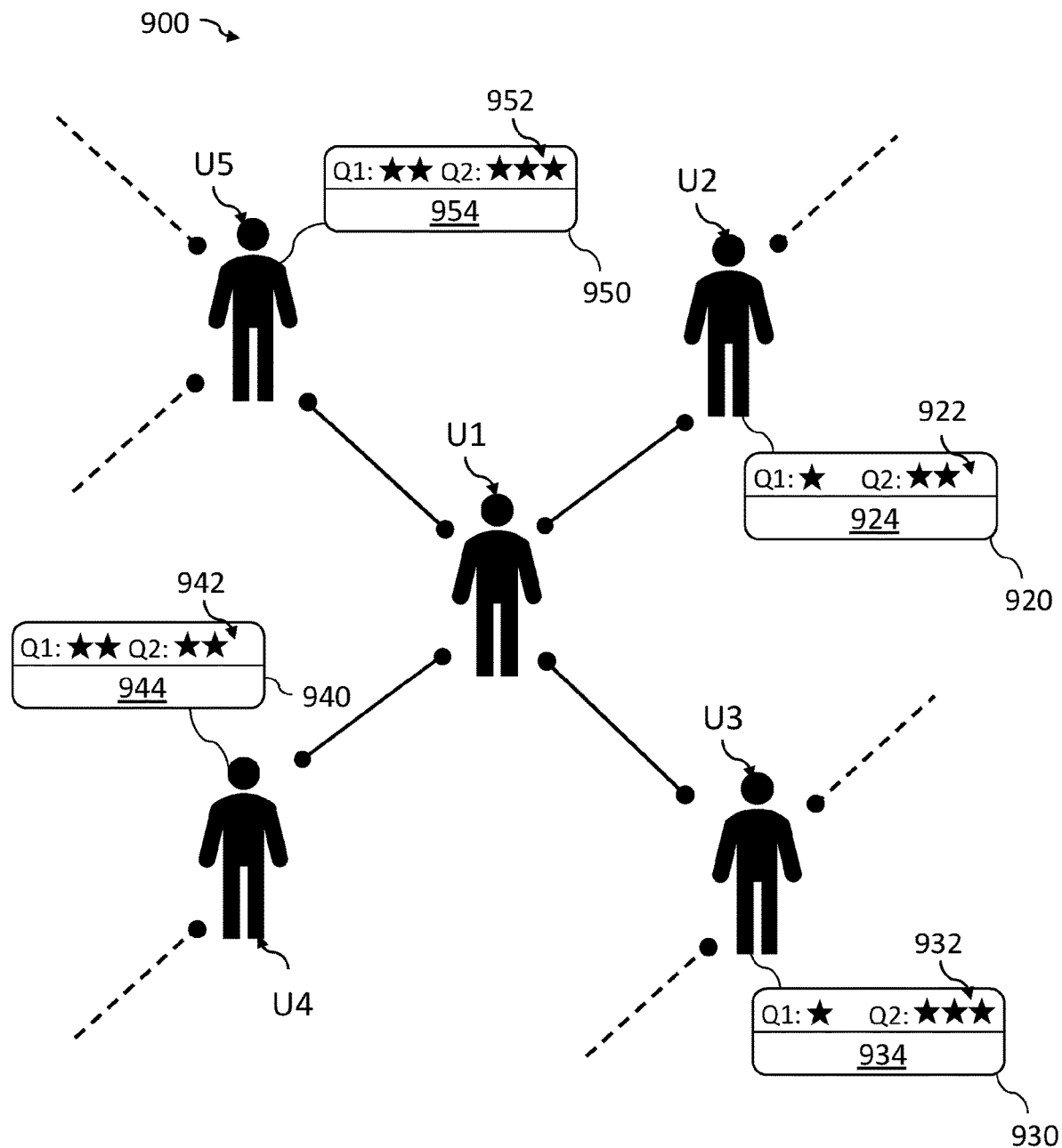
FIG. 9 illustrates a personalized network of a user in accordance with non-limiting embodiments of the present technology.

FIG. 9 is a schematic representation of a personalized network 900 of a user U1 in accordance with an embodiment of the present technology. In the illustrative example of FIG. 9, the personalized network 900 of the user U1 comprises four users referred to as U2, U3, U4 and U5. The personalized network 900 may be symmetrical or asymmetrical. For each SP registered in the recommendation platform 112, the user U1 may access and be displayed on a user device of the user U1 digital content related to the users U2, U3, U4 and U5, and thus view endorsements of the SPs made by U2, U3, U4 and U5.

For a first SP of the recommendation platform 112, the user U2, U3, U4 and U5 provided sets of endorsement data 920, 930, 940 and 950 respectively. Each set of endorsement data comprises structured endorsement data and unstructured endorsement data. In this embodiment, the set of endorsement data 920 comprises structure endorsement data 922 comprising endorsement scores for two characteristics Q1 and Q2 of the first SP. For instance, when the user U2 was provided a service by the first SP, the user U2 may have been ask to indicate a score for the two characteristics Q1 and Q2 of the first SP (for instance, Q1 is indicative of a communication of the SP, and Q2 is indicative of a level of professionalism of the first SP). In the same or another embodiment, the user U2 may have indicated the scores of Q1 and Q2 without being asked to do so. Any other number of characteristics of the first SP to be endorsed by the users is contemplated, this aspect is not limitative.

The set of endorsement data 920 also comprises unstructured endorsement data 924 comprising textual and/or visual information provided by the user U2 for the first SP. For example, the unstructured endorsement data 924 may comprise textual comments, images, videos and/or other forms of digital item that have been published by the user U2 on the recommendation platform 112 and that have been explicitly or implicitly related to the first SP by the user U2. For instance, the user U2 may indicating that the first SP provided a service for the user U2 upon publishing a picture or a text relating to said service. As another example, the user U2 may comment a picture or a text published by the first SP. Said comments may be identified by the server as unstructured endorsement data for the first SP by the user U2.

Similarly, the users U3, U4 and U5 may have provided endorsement data 930, 940 and 950 respectively. In this embodiment, any one of the sets of endorsement data for a SP by a user of the personalized network of the user U1 may be empty. In the illustrative example of FIG. 9, the sets of endorsement data 930, 940 and 950 comprise structured endorsement data 932, 942 and 952 respectively. The sets of endorsement data 930, 940 and 950 also comprise unstructured endorsement data 934, 944 and 954 respectively. The user of the personalized network of U1 may have provided endorsement data for a plurality of SPs. Endorsement data for other SPs may have the same form of the sets of endorsement data 920, 930, 940 and 950 for the first SP. For each user, the endorsement data for each SP may be stored in the database 110.

Figure 10:
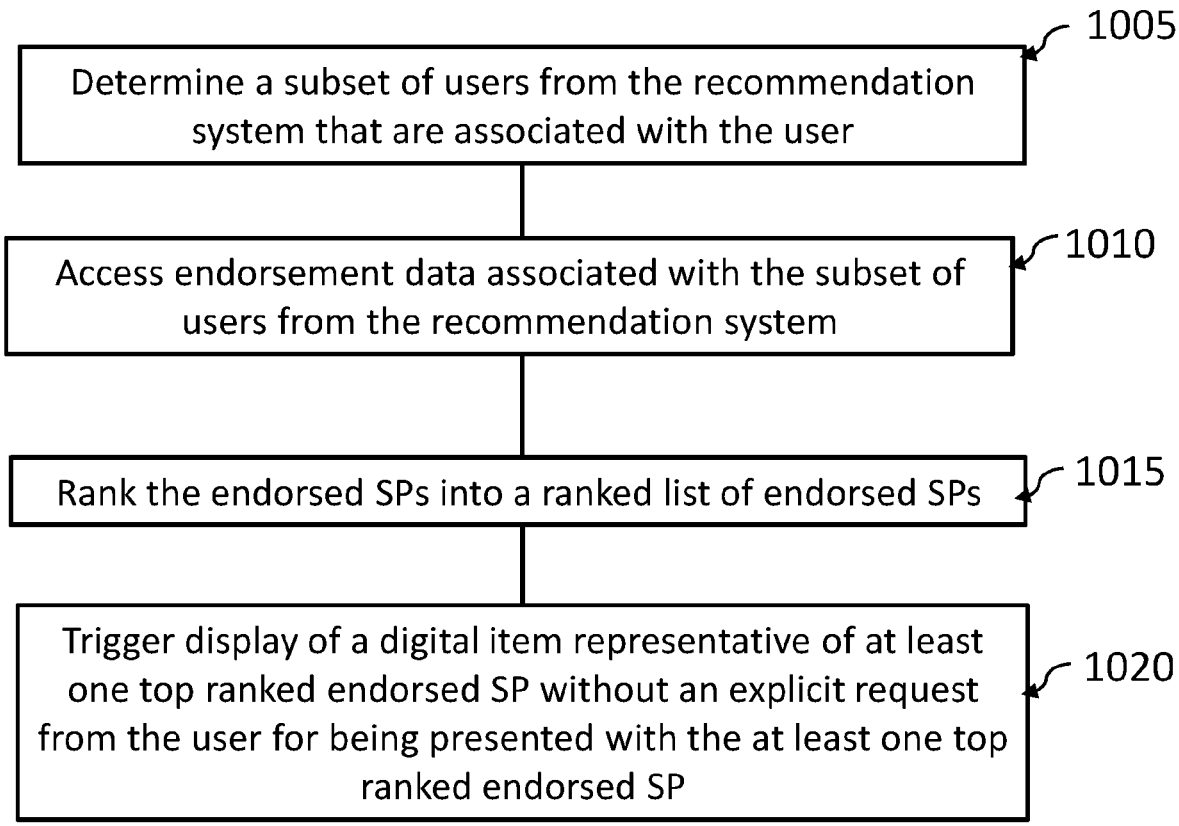
FIG. 10 illustrates a flow diagram showing operations of a method for recommending a service provider to a user of a recommendation in accordance with non-limiting embodiments of the present technology.

FIG. 10 is a flow diagram of a method 1100 for recommending a SP to a user of the recommendation system 100 according to some embodiments of the present technology. In one or more aspects, the method 1000 or one or more steps thereof may be performed by a computing unit or a computer system, such as the server 102. The method 1000 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 1005: Determine a Subset of Users from the Recommendation System that are Associated with the User At step 1005, the server 102 is configured to determine a subset of users from the recommendation platform that are associated with the given user, the subset of users exclusively including users from the recommendation platform that are connected with the user on the recommendation platform.

More specifically, the server 102 may identify the personalized network of the user as the subset of users. At this step, the endorsement processor 140 may be configured to retrieve and/or identify users of the personalized network, or contacts, of the user in the database 110. In this embodiment, the endorsement processor 140 is configured to identify the users that have a direct connection with the user. The contacts of the user thus define a "immediate circle" of the user.

Step 1010: Access Endorsement Data Associated with the Subset of Users from the Recommendation System At step 1010, the server 102 may access from, for example, the database 110, endorsement data associated with the subset of users. As described herein before, the endorsement data is indicative of endorsed SPs by the subset of users, the endorsement data including structured endorsement data indicative of endorsement scores provided by the subset of users for the endorsed SPs and unstructured endorsement data indicative of at least one of textual and visual information provided by the subset of users for the endorsed SPs, as described in FIG. 9.

Step 1015: Rank the Endorsed SPs into a Ranked List of Endorsed SPs

At step 1015, the server 102 is configured to rank the SPs into a ranked list of endorsed SPs based on the user vector and the endorsement data. In this embodiment, the endorsed SPs that have high scores in characteristics that are potentially interesting the user and/or having high amount of unstructured endorsement data may be set higher in the ranked list of endorsed SPs. For instance, if determination is made that the user is interested in carpentry services and that his contacts have endorsed a characteristic indicative of a carpentry skill of an SP, said SP may be ranked higher in the ranked list of endorsed SPs.

In one embodiment, the server 102 employs an MLA for ranking the endorsed SPs based on the user's interest and endorsement data provided by its contacts. More specifically, the server 102 may be configured to train the MLA to rank endorsed SPs for a given user based on corresponding user's interests and endorsement data provided by its contacts. The server may be configured to access training endorsement data provided by training contacts of a training user for training endorsed SPs. In this embodiment, the server 102 may be configured to generate a training set for training the MLA. The training set may comprise a training user vector representative of the user data (information indicative of user interests), associated with a training user. The training set may also comprise a set of training SP vectors for respective ones from the training endorsed SPs and representative of the respective structure endorsement data and unstructured endorsement data provided by the respective ones from the training contacts. The training set may further comprise a training label indicative of that previously recommending a given one from the training endorsed SPs to the training user resulted in more user engagement than previously recommending other ones from the training endorsed SPs to the training user.

In this embodiment, the MLA may be trained based on the training set to predict a endorsement ranking score for each of the SP and for a given user, based on the user vector and the SP vectors. More specifically, the MLA may be trained to set the endorsement ranking score of a first SP higher than the endorsement ranking score of a second SP when an interaction between the user and the first SP resulted in more user engagement than an interaction between the user and the second SP.

In this embodiment, for a given user, the endorsement ranking score of a given SP is further weighted by endorsement scores provided by users of the personalized network comprised in the structured endorsement data associated thereto. In one embodiment, the endorsement ranking score of a given SP is further weighted by a quantity of unstructured endorsement data provided by users of the personalized network for the given SP.

Step 1020: Trigger Display of a Digital Item Representative of at Least One Top Ranked Endorsed SP without an Explicit Request from the User for being Presented with the at Least One Top Ranked Endorsed SP At step 1020, the server 102 triggers display of a digital item representative of at least one top ranked endorsed SP without an explicit request from the user for being presented with the at least one top ranked endorsed SP. The ranked list of endorsed SPs or a portion thereof may, for instance, be rendered by the feed generator 120 on the user device.

Figure 11:
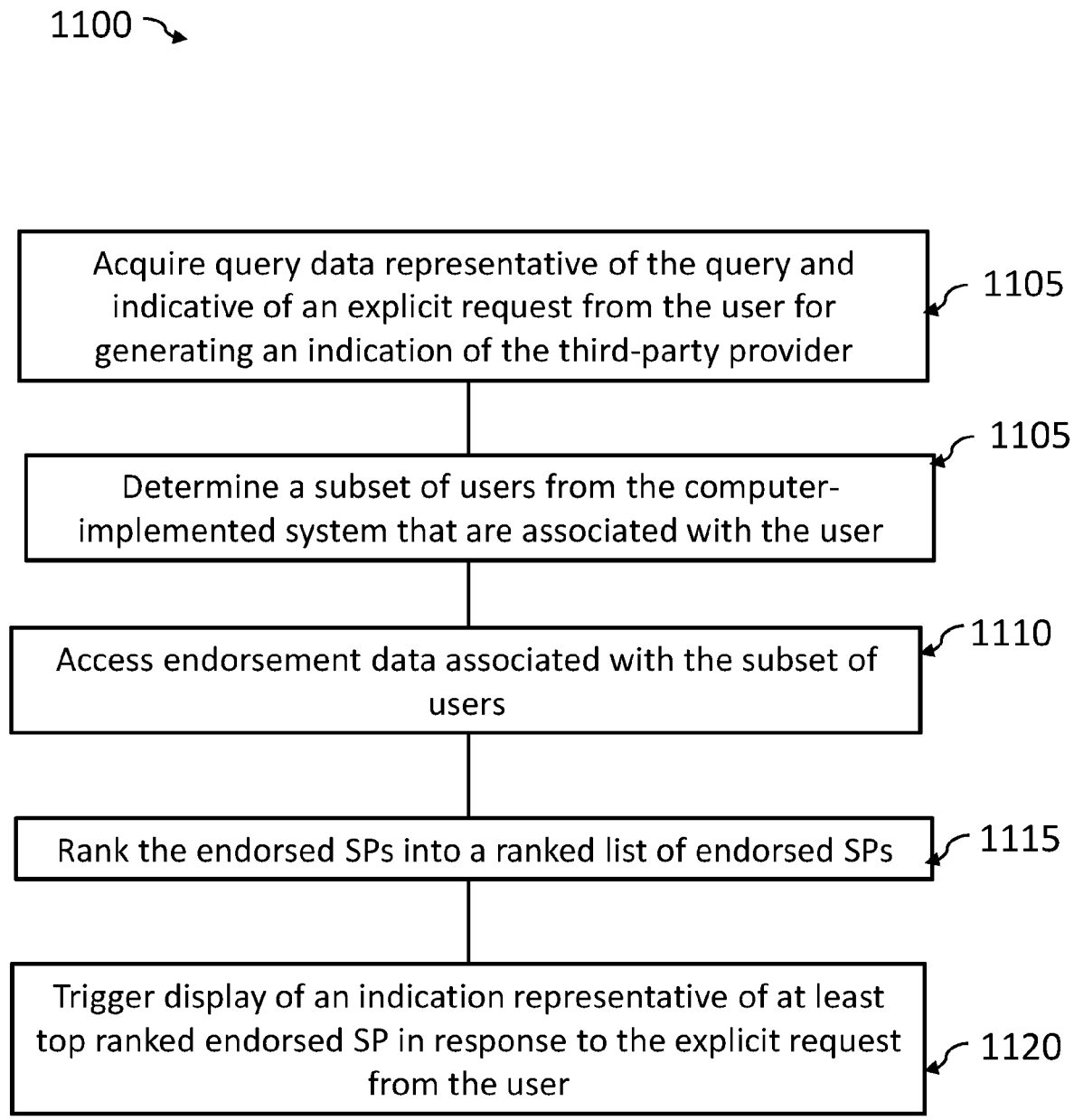
FIG. 11 illustrates a flow diagram showing operations of another method for recommending a service provider to a user of a recommendation in accordance with non-limiting embodiments of the present technology.

FIG. 11 is a flow diagram of a method 1100 for generating an indication of a SP to a given user of a computer-implemented system, such as the recommendation system 100, in response to a query from the user according to some embodiments of the present technology. In one or more aspects, the method 1100 or one or more steps thereof may be performed by a computing unit or a computer system, such as the server 102. The method 1100 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

Step 1105: Acquire Query Data Representative of the Query and Indicative of an Explicit Request from the User for Generating an Indication of the Third-Party Provider At step 1105, the server 102 acquires query data representative of the query and indicative of an explicit request from the user for generating an indication of the SP. The query data may comprise, without limitation, a geographic location of the SP, a range of price associated with services and/or products provided by the SP, information indicative of a minimum endorsement rank of the SP, etc.

Step 1110: Determine a Subset of Users from the Computer-Implemented System that are Associated with the User At step 1110, the server 102 is configured to determine a subset of users from the computer-implemented system, such as the recommendation system 100, that are associated with the given user, the subset of users exclusively including users from the computer-implemented system that are connected with the user on the computer-implemented system.

More specifically, the server 102 may identify the personalized network of the user stored in the database 110. At this step, the endorsement processor 140 may be configured to retrieve and/or identify users of the personalized network, or contacts, of the user in the database 110. In this embodiment, the endorsement processor 140 is configured to identify the users that have a direct connection with the user. The contacts of the user thus define a "immediate circle" of the user.

Step 1120: Access Endorsement Data Associated with the Subset of Users

At step 1120, the server 102 access endorsement data associated with the subset of users from the computer-implemented system. As described herein before, the endorsement data is indicative of endorsed SP by the subset of users, the endorsement data including structured endorsement data indicative of endorsement scores provided by the subset of users for the endorsed SP and unstructured endorsement data indicative of at least one of textual and visual information provided by the subset of users for the endorsed SP, as described in FIG. 9.

Step 1125: Rank the Endorsed SPs into a Ranked List of Endorsed SPs

At step 1125, the server 102 is configured to rank the one or more SP into a ranked list of endorsed SPs based on the user vector, the query data and the endorsement data. In this embodiment, the endorsed SPs that have high scores in characteristics that are potentially interesting the user and/or having high amount of unstructured endorsement data may be set higher in the ranked list of endorsed SPs. For instance, if determination is made that the user is searching for interior design services based on the query data, SP providing interior design services may be ranked higher in the ranked list of endorsed SPs.

In one embodiment, the server 102 employs an MLA for ranking the endorsed SPs based on the user's interest and endorsement data provided by its contacts. More specifically, the server 102 may be configured to train the MLA to rank endorsed SPs for each user based on corresponding user's interests, the query data, and endorsement data provided by its contacts. The server may be configured to access training endorsement data provided by training contacts of a training user for training endorsed SPs. In this embodiment, the server 102 may be configured to generate a training set for training the MLA. The training set may comprise a training user vector representative of the user data, or the user's interests, associated with a training user. The training set may also comprise a set of training SP vectors for respective ones from the training endorsed SPs and representative of the respective structure endorsement data and unstructured endorsement data provided by the respective ones from the training contacts. The training set may further comprise a training label indicative of that previously recommending a given one from the training endorsed SPs to the training user resulted in more user engagement than previously recommending other ones from the training endorsed SPs to the training user.

In this embodiment, the MLA may be trained based on the training set to predict an endorsement ranking score for each of the SP and for each user, based on the user's interest and endorsement data provided by the contacts of the user. More specifically, the MLA may be trained to set the endorsement ranking score of a first SP higher than the endorsement ranking score of a second SP when engagement and/or endorsement for the first SP by the contacts of the user is higher. The engagement and/or endorsement for a SP by the contacts of the user may be an average of the structured endorsement data provided by each contact. In one embodiment, the average is weighted by a quantity of unstructured endorsement data provided by the contacts for the SP.

Step 1130: Trigger Display of an Indication Representative of at Least Top Ranked Endorsed SP in Response to the Explicit Request from the User At step 1020, the server 102 triggers display of the ranked list on the user device of the user and the ranked list of endorsed is thus rendered by the feed generator 120 on the user device. More specifically, the feed generator may display one or more digital items representative of one or more corresponding top ranked endorsed SPs from the ranked list.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of controlling navigation paths of users of a recommendation system, the recommendation system being hosted by a server, the users being associated with respective electronic devices, the respective electronic devices being communicatively coupled with the server, the method being executable by the server, the method comprising:

determining, by the server, first recommendable content for a first user of a first electronic device and second recommendable content for a second user of a second electronic device, the first user being distinct from the second user;

the first and the second recommendable content both including a digital item, the digital item being associated with a plurality of actions;

triggering, by the server, display on the first electronic device of at least some content from the first recommendable content including the digital item associated with a first action from the plurality of actions, the first action being triggerable by the first user on the first electronic device, the first action being selected from the plurality of actions based on information about the first user;

upon the first user triggering the first action, directing the first user on a first navigation path in the recommendation system including the digital item;

triggering, by the server on the second electronic device, display of at least some of the second recommendable content including the digital item associated with a second action from the plurality of actions, the second action being triggerable by the second user on the second electronic device, the second action being selected from the plurality of actions based on information about the second user, the first action triggerable by the first user being distinct from the second action triggerable by the second user;

upon the second user triggering the second action, directing the second user on a second navigation path in the recommendation system including the digital item, the first navigation path being different from the second navigation path; wherein the digital item is associated with a plurality of third-party providers, the first navigation path being associated with a first one of the plurality of third-party providers; and the second navigation path being associated with a second one of the plurality of third-party providers, the first one of the plurality of third-party providers being different than the second one of the plurality of third-party providers.

2. The method of claim 1, wherein the first action being further selected based on the first one from the plurality of third-party providers, and the second action being further selected based on the second one from the plurality of third-party providers.

3. The method of claim 2, wherein the method further comprises:

determining, by the server, a recommended third-party provider for the first user amongst the plurality of third-party providers associated with the digital item based on endorsement of respective ones from the plurality of third-party providers by other users of the recommendation system, the other users being connected to the first user on the recommendation system, the recommended third-party provider being the first one from the plurality of third-party providers associated with the first action.

4. The method of claim 1, wherein the first action is provision of a first additional digital item generated by the first one from the plurality of third-party providers, the first additional digital item being subsequent to the digital item in the first navigation path, the second action is provision of a second digital item generated by the second one from the plurality of third-party providers, the second additional digital item being subsequent to the digital item in the second navigation path.

5. The method of claim 1, wherein the determining the first recommendable content and the second recommendable content comprises:

determining, by the server, a first set of digital items from a pool of potentially recommendable items for the first user based on a relevance of respective content to the first user, the first set of digital items being the first recommendable content and including the digital item;

determining, by the server, a second set of digital items from the pool of potentially recommendable items for the second user based on a relevance of respective content to the second user, the second set of digital items being the second recommendable content and including the digital item.

6. The method of claim 1, wherein the method further comprises:

ranking, by the server employing a Machine Learning Algorithm (MLA), digital items from the first recommendable content into a ranked list of recommendable digital items; and selecting, by the server, top ranked digital items from the ranked list as the at least some of the first recommendable content to be displayed to the first user, the top ranked digital items including the digital item associated with the first action.

7. The method of claim 6, wherein the method further comprises:

generating, by the server, a training set for training the MLA, the training set including:

a first training item dataset comprising information indicative of a training digital item associated with a first training action, a second training item dataset comprising information indicative of the training digital item associated with a second training action, a training user dataset indicative of information about a training user; and a training label indicative of that previously displaying the training item from the first training item dataset to the training user resulted in more user engagement than previously displaying the training item from the second training item dataset; and training, by the server, the MLA based on the training set to predict:

a first ranking score for the training item from the first training item dataset and a second ranking score for the training item from the second training item dataset, and such that the first ranking score is above the second ranking score.

8. A server for controlling navigation paths of users of a recommendation system, the server hosting the recommendation system, the server being communicatively coupled with a first electronic device associated with a first user and a second electronic device associated with a second user, the first and the second electronic devices being configured to display interfaces of the recommendation system to the first and second users respectively, the server being communicatively coupled with a memory storing potentially recommendable digital items, the server being configured to:

determine first recommendable content for a first user of a first electronic device and second recommendable content for a second user of a second electronic device, the first user being distinct from the second user;
the first and the second recommendable content both including a digital item, the digital item being associated with a plurality of actions;
trigger on the first electronic device, display of at least some content from the first recommendable content including the digital item associated with a first action from the plurality of actions, the first action being triggerable by the first user on the first electronic device,
the first action being selected from the plurality of actions based on information about the first user;
upon the first user triggering the first action, direct the first user on a first navigation path in the recommendation system including the digital item;
trigger on the second electronic device, display of at least some of the second recommendable content including the digital item associated with a second action from the plurality of actions, the second action being triggerable by the second user on the second electronic device,
the second action being selected from the plurality of actions based on information about the second user,
the first action triggerable by the first user being distinct from the second action triggerable by the second user; and
upon the second user triggering the second action, direct the second user on a second navigation path in the recommendation system including the digital item, the first navigation path being different from the second navigation path; wherein
the digital item is associated with a plurality of third-party providers, the first navigation path being associated with a first one of the plurality of third-party providers; and
the second navigation path being associated with a second one of the plurality of third-party providers, the first one of the plurality of third-party providers being different than the second one of the plurality of third-party providers.

9. The server of claim 8, wherein the first action being further selected based on the first one from the plurality of third-party providers, and the second action being further selected based on the second one from the plurality of third-party providers.

10. The server of claim 8, wherein the first action causes the server to trigger provision of a first additional digital item generated by the first one from the plurality of third-party providers to the first electronic device, the first additional digital item being subsequent to the digital item in the first navigation path, the second action causing the server to trigger provision of a second digital item generated by the second one from the plurality of third-party providers, the second additional digital item being subsequent to the digital item in the second navigation path.

11. The server of claim 8, wherein, upon determining the first recommendable content and the second recommendable content, the server is further configured to:
determine a first set of digital items from a pool of potentially recommendable items for the first user based on a relevance of respective content to the first user,
the first set of digital items being the first recommendable content and including the digital item;
determine a second set of digital items from the pool of potentially recommendable items for the second user based on a relevance of respective content to the second user,
the second set of digital items being the second recommendable content and including the digital item.

12. The server of claim 8, wherein the server is further configured to:
rank, by employing a Machine Learning Algorithm (MLA), digital items from the first recommendable content into a ranked list of recommendable items; and
select top ranked digital items from the ranked list as the at least some of the first recommendable content to be displayed to the first user, the top ranked digital items including the digital item associated with the first action.

13. The server of claim 12, wherein the server is further configured to:
generate a training set for training the MLA, the training set including:
a first training item dataset comprising information indicative of a training digital item associated with a first training action,
a second training item dataset comprising information indicative of the training digital item associated with a second training action,
a training user dataset indicative of information about a training user; and
a training label indicative of that previously displaying the training item from the first training item dataset to the training user resulted in more user engagement than previously displaying the training item from the second training item dataset; and
train the MLA based on the training set to predict:
a first ranking score for the training item from the first training item dataset and a second ranking score for the training item from the second training item dataset, and such that the first ranking score is above the second ranking score.

* * * * *